United States Patent [19]

Watkins et al.

[11] Patent Number: 4,918,626
[45] Date of Patent: Apr. 17, 1990

[54] COMPUTER GRAPHICS PRIORITY SYSTEM WITH ANTIALIASING

[75] Inventors: Gary S. Watkins; Glen A. Eckart; Russell A. Brown, all of Salt Lake City, Utah

[73] Assignee: Evans & Sutherland Computer Corp., Salt Lake City, Utah

[21] Appl. No.: 130,811

[22] Filed: Dec. 9, 1987

[51] Int. Cl.⁴ .................... G06F 15/72; G06F 15/62
[52] U.S. Cl. .................... 364/522; 364/518; 364/521; 340/729; 340/728; 340/747
[58] Field of Search ............ 340/729, 728, 747; 358/903; 364/522, 518, 521; 382/52, 33, 36, 41, 56

[56] References Cited

U.S. PATENT DOCUMENTS

| | | | |
|---|---|---|---|
| 3,602,702 | 8/1971 | Warnock | 364/522 |
| 3,816,726 | 6/1974 | Sutherland et al. | 364/518 |
| 4,679,040 | 7/1987 | Yan | 340/747 |
| 4,780,711 | 10/1988 | Doumas | 340/728 |
| 4,811,245 | 3/1989 | Bunker et al. | 364/521 |
| 4,812,988 | 3/1989 | Duthuit et al. | 364/522 |

OTHER PUBLICATIONS

Newman et al. "Principles of Interactive Computer Graphics" (2nd ed.) McGraw-Hill, 1979, (pp. 376–379).

*Primary Examiner*—Gary V. Harkcom
*Assistant Examiner*—Raymond J. Bayerl
*Attorney, Agent, or Firm*—Nilsson, Robbins, Dalgarn, Berliner, Carson & Wurst

[57] ABSTRACT

Image data is composed from primitives (polygons) to attain data for displays with the removal of hidden surfaces and smooth-appearing edges. Defined polygons are tested for priority in a determined field of vision by scan conversion to specify individual picture elements (pixels). Polygon contention for pixels is resolved by determining the edge of intersection between the planes of such polygons and testing the signs of certain values in accordance with predetermined criteria. Subpixel priority is treated for similar resolution to provide improved antialiased images.

20 Claims, 7 Drawing Sheets

COMPUTER GRAPHICS PRIORITY SYSTEM WITH ANTIALIASING

BACKGROUND AND SUMMARY OF THE INVENTION

Perhaps video games are the best known form of computer graphics systems. However, the science involves a considerable number of other forms of display apparatus as for training, design, modeling and so on. Typically, these systems give the viewer an impression of looking through a window at a large picture. Essentially, the computer graphics system selects image content from object data, orients it with respect to the window and displays it as a logical picture.

One computer graphics technique forms pictures from polygons (closed outlines bounded by straight edges) that define the basic solid areas of gray or color to constitute an object for the display. Conventional practice involves orienting such polygons with respect to a viewpoint, scanning them to determine individual picture elements (pixels) of the display then processing data for the individual pixels. Essentially, the scan conversion and processing of a polygon involves finding all the unobstructed pixels inside the polygon boundaries and generating a display by appropriately setting the color and intensity for each pixel. In a traditional display, a million pixels may be employed to compose a picture.

Typically, preparatory to the display of a picture, image data is stored as a pattern of binary digital numbers that represent a rectangular array of pixels. For the display, pixel data may be supplied from storage to a cathode ray tube which displays the pixels in a raster pattern, a succession of scan lines each of which consists of a row of individual pixels. The raster pattern is most familiar in television displays.

Utilizing the techniques mentioned above, current computer graphics systems are capable of providing realistic images from primitives as planar polygons. As indicated above, the generation of such images involves selecting portions of these polygons which appear in the display. In that regard, several hidden surface and clipping techniques are in widespread use to eliminate obstructed surfaces and surfaces outside the viewing window. One system of clipping objects outside the field of vision is disclosed in U.S. Pat. No. 3,816,726 granted June 11, 1974, to Ivan E. Sutherland et al.

Some of the prior art techniques for treating hidden surfaces are disclosed in U.S. Pat. No. 3,602,702 granted Aug. 31, 1971, to John E. Warnock. Hidden surface techniques essentially determine the priority of interfering polygons. For example, when two spaced-apart polygons are intersected by a line of sight, the polygon closest to the viewpoint is given priority, and accordingly provides the data for the pixels involved in the contention. In general, the system of the present invention resolves priority between contending polygons at specific locations, e.g. pixels or subpixels.

In determining priority between a pair of polygons, an edge may be defined where the planes of the two polygons intersect. Of course, such an edge appears in the display and may have an undesirable jagged or staircase appearance. Such edges are somewhat common in raster displays and are well known in television pictures. Such defects are generally called "aliasing" or "rastering". They can be avoided by filtering the pixels through which the edge passes. The present invention incorporates such techniques to accomplish improved displays.

Summarizing, quality pictures can be produced by raster scan techniques that involve: (1) prioritizing image-source polygons with respect to a viewpoint so as to define individual pixels that eliminate hidden surfaces; (2) filtering the pixels that lie on an edge between the image polygons to reduce jagged demarcations; and (3) smooth shading the image polygons to reduce the appearance of individual polygons. Each of these techniques is well known in the prior art, and apparatus for its implementation is in widespread use. The present invention primarily impacts the techniques: (1) prioritizing and (2) filtering.

In general, the system of the present invention is embodied as a process or product for resolving priority between polygons contending for individual areas in a display, e.g. pixels or subpixels. Priority is resolved by defining the edge where the planes of the two polygons intersect, then by applying a simple test of sign values after transforming the edge to the space of the display screen and determining the slope of such an edge. Along with resolving priority between contending polygons, the system as disclosed herein filters the pixel data. Accordingly, the system facilitates production of relatively clean, sharp edges in a video graphics raster scan display.

BRIEF DESCRIPTION OF THE DRAWINGS

In the drawings, which constitute a part of this specification, exemplary embodiments exhibiting various objectives and features hereof are set forth, specifically.

DESCRIPTION OF THE ILLUSTRATIVE EMBODIMENT

An illustrative structural embodiment of the present invention is disclosed herein; however, it is merely representative, recognizing that a wide variety of specific embodiments of the disclosed system are possible. Nevertheless, the illustrative embodiment is deemed to afford the best embodiment for purposes of disclosure and to provide a basis for the claims herein which define the scope of the present invention.

Figure 1:
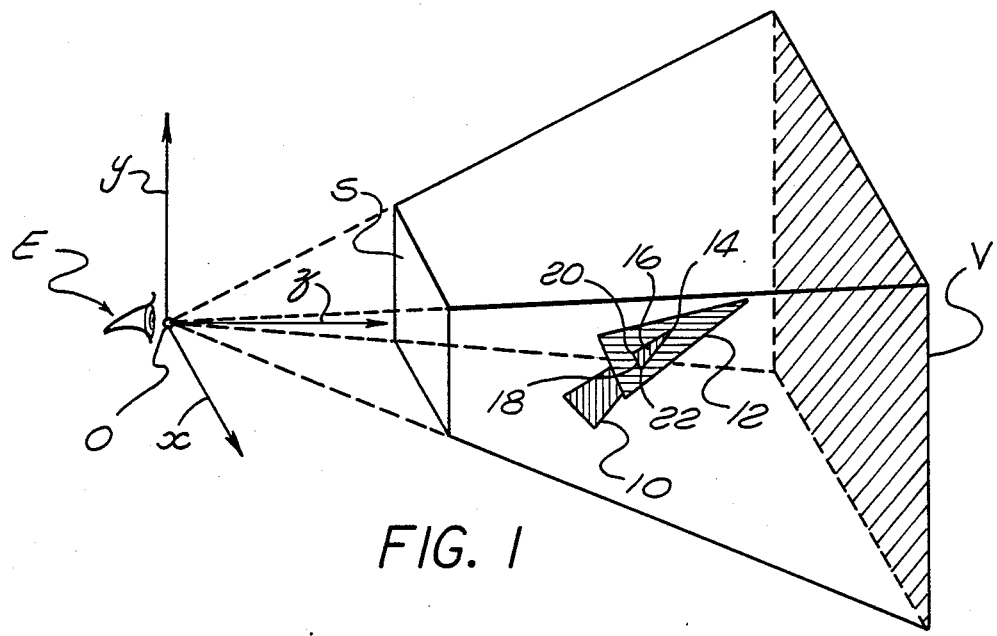
FIG. 1 is a perspective representation illustrating contending polygons for a display as to be resolved in accordance with the present invention.

A truncated pyramidal volume V is illustrated in FIG. 1 to indicate a world space field of vision for a viewer represented by an eye E and located at a viewpoint O. Generally, a graphic display is provided by presenting objects on a screen surface S, which objects lie in various positional relationships within the volume V (world space). Presented at the screen surface S, the objects are reduced to a composite two-dimensional array of pixels.

As disclosed herein, represented objects take the form of polygons, specifically as the triangular polygons 10 and 12 which are defined in world space. Note that while the object polygons 10 and 12 are defined in world space in three dimensions, x, y and z, the same triangles must be transformed to perspective space prior to hidden surface processing. During hidden surface processing, certain edges are projected to the two-dimensional screen surface S, with the consequence that these edges are only represented in x and y dimensions. Techniques for these transformations are well known as described in a book, "Principles of Interactive Computer Graphics", Second Edition, Newman and Sproull, published 1979 by McGraw-Hill Book Company, see page 339.

As illustrated in FIG. 1, the polygons 10 and 12 extend in the z dimension of world space and are interpenetrating. Traditionally, polygons such as the polygons 10 and 12 are defined in computer graphics apparatus by representations of vertices, that is the corners or terminal points of the triangles. With the vertices specified, the planes of the polygons 10 and 12 are readily available in mathematical form. Such planes are important in awarding pixels as between such contending triangles.

With respect to the polygons 10 and 12, note that the apex of the polygon 10 (terminating at a vertex 14) pierces the polygon 12 exposing a small-area triangle 16. The base of the small triangle 16 extends between corners 20 and 22 and defines an edge 18 between the polygons 10 and 12. As described in detail below, the system of the present invention is effective to distinguish between portions of the polygons 10 and 12 along edges as exemplified by the edge 18. That is, the system of the present invention is effective as a priority resolver to determine the content of pixels so as to eliminate hidden surfaces and accomplish antialiasing.

At this point, some background comments are deemed appropriate regarding techniques for eliminating hidden surfaces. Some such techniques are described in the referenced book, "Principles of Interactive Computer Graphics". The so-called "Z-buffer" or depth-buffer technique dissects polygons into individual picture elements (pixels). As each polygon is processed, its representative pixels are determined to be closer or more remote than previously processed polygons. In each case, the closer pixel data is preserved and the more remote is sacrificed. Consequently, at the conclusion of the processing, data for each pixel is distilled to represent the polygon surface nearest to the eye. Thus, hidden surfaces are eliminated. Although the depth-buffer technique has been embodied in various apparatus in the past, known forms are ineffective in avoiding jagged or aliased edges. For example, using prior depth-buffer techniques, the intersection edge 18 and all boundary edges of polygons 10 and 12 (FIG. 1) would appear as an undesirable stepped or jagged line of demarcation. On the contrary, the system of the present invention not only resolves priority between contending polygons but facilitates antialiasing of all boundary and intersection edges.

Figure 2:
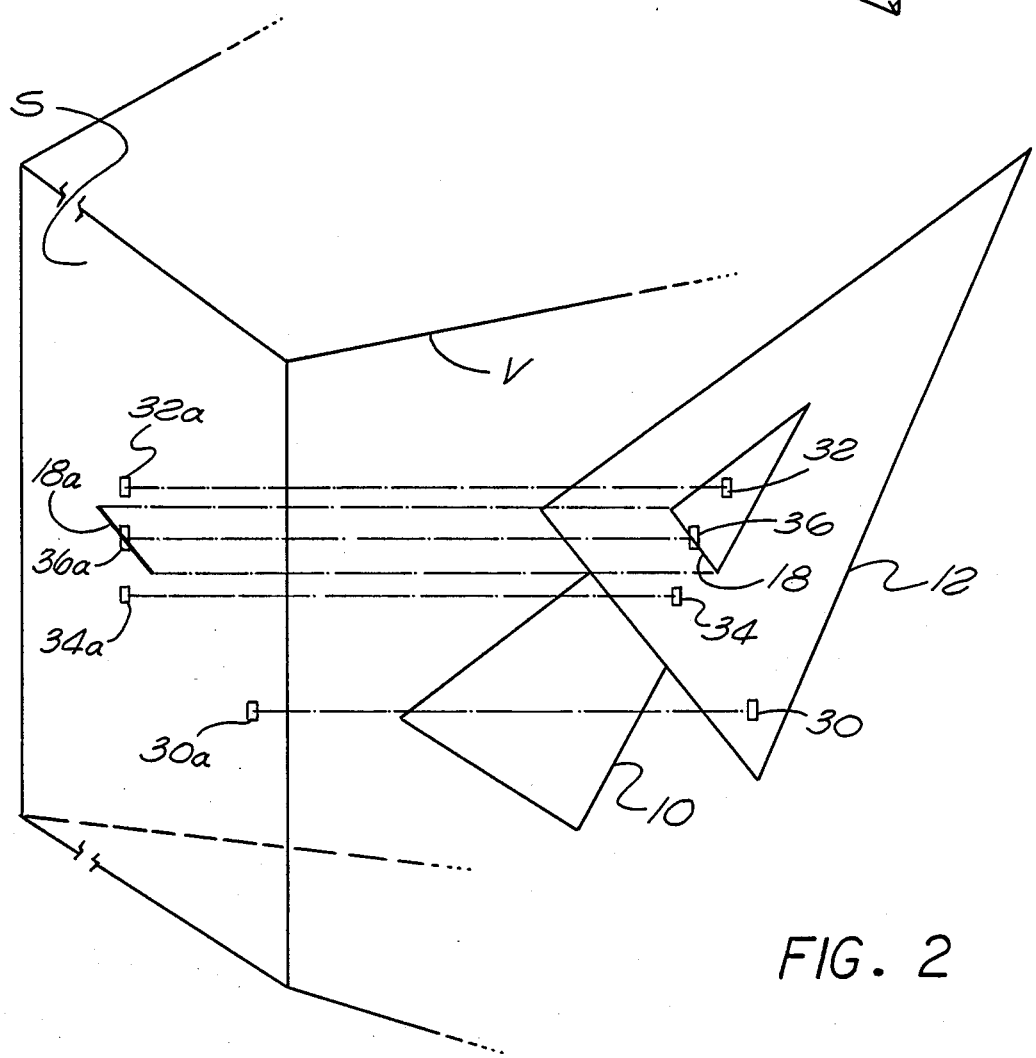
FIG. 2 is an enlarged and distorted view of a portion of FIG. 1.

To consider the system of the present invention in greater detail, reference will now be made to FIG. 2 showing an enlarged form of the polygons 10 and 12. Note that the pyramidal volume V is shortened and fragmentarily represented; however, the screen surface S is illustrated in relation to the polygons 10 and 12. It is noteworthy that proportions and scale are sacrificed in the interests of ease of explanation.

As explained above, the edge 18 constitutes an intersection between the polygons 10 and 12. As illustrated in FIG. 2, the three-dimensional edge 18 must be transformed to a two-dimensional edge 18a on the screen surface S. In the display, the edge 18a (defined by pixels) ideally constitutes a straight, clean demarcation between the polygons 10 and 12. Consider some possible pixels taken in the area somewhat adjacent to the edge 18a.

A small component area 30 is designated near the lower right corner of the polygon 12. A representative pixel 30a for the area 30 is indicated on the screen surface S. From the location of the area 30 on the polygon 12, it will be apparent that the area does not overlap or contend with any area of the polygon 10. Consequently, as between the polygons 10 and 12, only the polygon 12 contends for the pixel 30a. Thus, the intensity and color of the polygon 12 totally control the pixel 30a. Other pixels as will now be considered are not so clearly designated.

An elemental area 32 is illustrated in a small triangle 16 which pierces the polygon 12 and obstructs an area on polygon 12. The elemental area 32 is pictured in the display by an aligned pixel 32a on the screen surface S.

Figure 3:
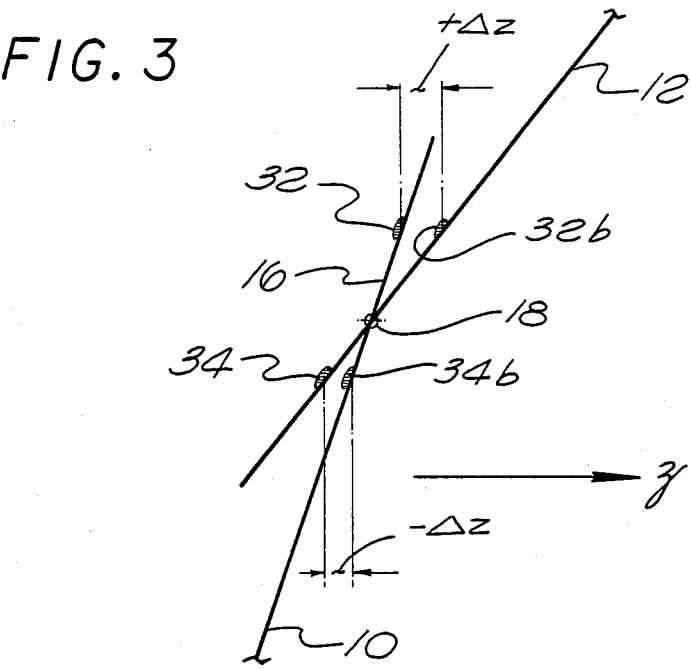
FIG. 3 is a graphic representation of a portion of FIG. 2 from a different angle.

As the polygon 10 represents an opaque surface, the pixel 32a should display solely the color and intensity of the polygon 10. As a consequence, the blocked or hidden surface of the polygon 12 should be obscured. To better understand the relationship, refer to FIG. 3 showing a cross-sectional view of the polygons 10 and 12 taken perpendicularly through the edge 18. FIG. 3 illustrates that the elemental area 32 lies directly in front of an aligned shadow area 32b on the polygon 12. Consequently, in the display, the shadow area 32b on the polygon 12 is to be obscured while the elemental area 32 is to be displayed.

Note that the two areas 32 and 32b (above the edge 18) are spaced apart by a distance $+\Delta Z$ between the planes of the polygons 10 and 12. It is noteworthy that above the edge 18, the positive sign of $+\Delta Z$ resolves pixel priority in favor of the elemental area 32.

Next, consider an elemental area 34 (FIG. 2) on the polygon 12 which is to be represented by a pixel 34a. The area 34 obscures an area 34b (FIG. 3) on the polygon 10. Accordingly, the polygon 12 (containing the area 34) should dominate the pixel 34a with color and intensity. In this instance, it is noteworthy that below the edge 18 (FIG. 3) the negative sign of the offset $-\Delta Z$ resolves priority in favor of the elemental area 34.

From the above it will be apparent that, as between a pair of intersecting polygons, priority can be resolved based on the mere sign of the offset $\Delta Z$ with regard to the edge 18. The system of the present invention involves determining the edge 18 as a basis for utilizing signs to resolve priority.

Next, it is important to recognize that the system hereof may be employed for elemental areas 36 (FIG. 2) that are intersected by the edge 18. Such areas are treated by resorting to subpixels. That is, a pixel 36a lying on the edge 18a may be further divided into subpixels and effectively filtered in accordance herewith to accomplish an antialiased display. By dividing pixels into subpixels and individually awarding such subpixels to polygons, edges are displayed that appear to the human eye as smooth demarcations. Of course, as the screen locations of edges are not known in advance, all pixels are divided into subpixels to permit antialiasing of an edge as may occur anywhere on the screen.

Figure 4:
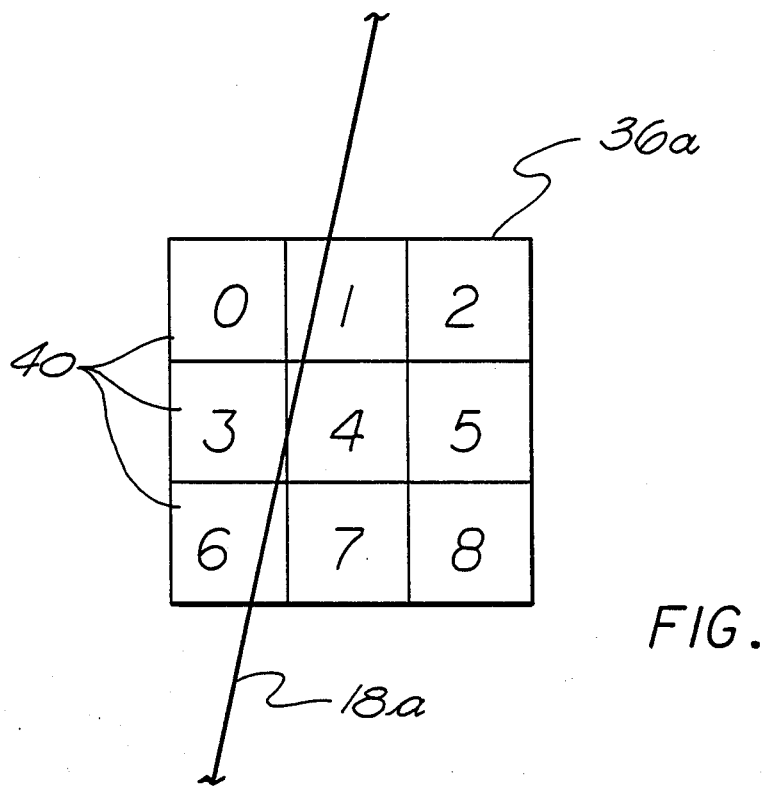
FIG. 4 is a graphic representation of a picture element generated in accordance with the present invention for a display.

FIG. 4 illustrates the single pixel 36a considerably enlarged from the representation in FIG. 2. For purposes of illustration the pixel 36a is represented by a square divided into nine subpixels 40. As indicated above, idealized forms are used disregarding proportions in the interests of simplifying the explanation. Note that the subpixels are numbered from zero to eight, beginning with the upper left subpixel and ending with the lower right subpixel. This convention will be used later.

As illustrated, the pixel 36a is divided by the edge 18a. Antialiasing is accomplished at the pixel 36a, as by awarding individual subpixels 40 to one of the contending polygons so that the edge 18a tends to appear as a smooth, straight line of demarcation. The use of subpixels to accomplish antialiasing is well known in the prior art and is described in a paper entitled, "The A-buffer, an Antialiased Hidden Surface Method", by Loren Carpenter, appearing in *Computer Graphics*, published in 1984 by The Association for Computing Machinery, Inc. Since the edge 18a is crucial to antialiasing, the techniques of the present invention to determine the equation of the edge 18a will now be treated, initially somewhat mathematically.

In accordance with conventional computer graphics techniques for display, the polygons 10 and 12 (FIG. 2) are transformed into perspective space. Accordingly, plane equations in perspective space for the polygons 10 and 12 may take the form:

$$a_1x + b_1y + c_1z + d_1 = 0 \quad (1a)$$

$$a_2x + b_2y + c_2z + d_2 = 0 \quad (1b)$$

Computing the line of intersection of the two planes and projecting it into screen space, i.e. onto the XY plane of the screen surface S produces:

$$(c_2a_1 - c_1a_2)x + (c_2b_1 - c_1b_2)y + (c_2d_1 - c_1d_2) = 0 \quad (2a)$$

For convenience, the above equation (2a) may be simplified as:

$$Ax + By + C = 0 \quad (2b)$$

where A, B and C are defined from the prior equation (2a).

Equation (2b) may specify either that the edge 18a (FIG. 2) is more horizontal (offset less than 45 degrees from the horizontal) or more vertical (offset more than 45 degrees from the horizontal). A more horizontal edge is specified when the absolute value of B exceeds the absolute value of A in the equation (2b), as can be appreciated from inspection of the following point-slope form of the equation (2b):

$$y = -(A/B)x - (C/B) \quad (3)$$

By inspection of equation (3), it may be seen that the edge will be more horizontal when the absolute value of B exceeds the absolute value of A, because the magnitude of the slope of the edge, expressed as A/B, is less than one.

A more vertical edge is specified when the absolute value of A exceeds the absolute value of B, as can be appreciated from inspection of the following point-slope form of the equation (2b):

$$x = -(B/A)y - (C/A) \quad (4)$$

By inspection of equation (4), it may be seen that the edge will be more vertical when the absolute value of A exceeds the absolute value of B, because the magnitude of the slope of the edge, expressed as B/A, is less than one.

Recapitulating to some extent, the edge 18a as defined by the equation (2b) divides the screen surface S into two regions. In one region (upper) the polygon 10 is in front of the polygon 12. In the other region (below), the polygon 12 is in front of the polygon 10. A very clever aspect of the present system resides in the manner in which it determines which polygon is in front on each side of the edge 18a. Prior to discussing details of that determination, consider a convention for the screen coordinate system as suggested in FIG. 1. Specifically, from the eye E, x increases to the right, y increases upward and z increases away from the eye E. With such a convention, the equations (1a) and (1b) may be written as:

$$z_1 = (-1/c_1)(a_1x + b_1y + d_1), \quad (5a)$$

and $$z_2 = (-1/c_2)(a_2x + b_2y + d_2) \quad (5b)$$

Using these equations, the difference in z-depth between the polygons $P_1$ and $P_2$, depicted as the polygons 10 and 12 (see FIG. 3), may be represented as:

$$\Delta Z = z_2 - z_1, \quad (6a)$$

or $$\Delta Z = (-1/c_2)(a_2x + b_2y + d_2) - (-1/c_1)(a_1x + b_1y + d_1) \quad (6b)$$

where $z_1$ and $z_2$ represent the z-depths of polygons $P_1$ and $P_2$ respectively.

If both sides of the equation (6b) are multiplied by $c_1$ and $c_2$, the result is:

$$c_1c_2\Delta Z = Ax + By + C \quad (6c)$$

Fascinatingly, the equation (6c) above allows utilization of the intersecting edge 18a (FIG. 2) to determine which of the polygons 10 or 12 is in front of the other on a particular side of the edge 18. This determination to resolve polygon priority is accomplished as explained below and involves the analysis and application of three distinct cases of polygon configuration, the first of which does not involve the intersecting edge.

The first case for resolving priority occurs when the polygons are parallel with the result that there is no intersecting edge (not illustrated). Such a configuration is easily visualized as the polygons simply lie in planes that are parallel, and accordingly there is no intersection. As a consequence, both A and B in the equation (6c) are zero and for the first case the equation (6c) may be written:

$$c_1 c_2 \Delta Z = C \qquad (7)$$

The above equation (7) indicates that the sign of $\Delta Z$ equals the sign of C, if the signs of $c_1$ and $c_2$ are the same. In that case, when C is positive, $\Delta Z$ also is positive indicating polygon $P_1$ is front-most as shown in FIG. 3. When C is negative, $\Delta Z$ is also negative, and polygon $P_2$ is front-most, again as shown in FIG. 3. As an alternative situation, when the signs of $c_1$ and $c_2$ are different, then the sign of $\Delta Z$ is opposite the sign of C. In this case, a positive C indicates that polygon $P_2$ is front-most, whereas a negative C indicates that polygon $P_1$ is front-most. The above may be reduced to a simple truth table for resolving priority:

Polygon Having Priority

|  | Signs of $c_1$ and $c_2$ the same? | |
|---|---|---|
| | yes | no |
| Sign of C  + | $P_1$ | $P_2$ |
| Sign of C  − | $P_2$ | $P_1$ |

Now, consider the second case which occurs when the absolute value of A is greater than the absolute value of B indicating that the edge 18a is more vertical. For this case, inspection of equation (6c) indicates that along the intersection edge 18a, $\Delta Z$ must be zero. If a small step is taken to the right of the edge in the direction of positive x, then $c_1 c_2 \Delta Z$ will be of the same sign as $A \Delta X$. Therefore, if $c_1$ and $c_2$ are of the same sign and $\Delta X$ is positive, then $\Delta Z$ is determined by the sign of A. That is, if A is positive for this case, then the polygon $P_1$ is in front of the polygon $P_2$ on the right side of the edge while the polygon $P_2$ is in front of the polygon $P_1$ on the left side of the edge. As indicated above, when the signs of $c_1$ and $c_2$ are different, the sense of the test is reversed. Accordingly, two more truth tables can be formulated as follows:

Polygon Having Priority on the Right Side of the Edge

|  | Signs of $c_1$ and $c_2$ the same? | |
|---|---|---|
| | yes | no |
| Sign of A  + | $P_1$ | $P_2$ |
| Sign of A  − | $P_2$ | $P_1$ |

Polygon Having Priority on the Left Side of the Edge

|  | Signs of $c_1$ and $c_2$ the same? | |
|---|---|---|
| | yes | no |
| Sign of A  + | $P_2$ | $P_1$ |
| Sign of A  − | $P_1$ | $P_2$ |

The third case occurs when the absolute value of B is greater than the absolute value of A indicating that the edge 18a is more horizontal. Somewhat similar to the approach taken above in the second case, it will be apparent that a small step above the edge in the direction of positive y will reveal the solution. If, as previously, $c_1$ and $c_2$ are of the same sign, then a positive value of B indicates that $P_1$ is in front of $P_2$ above the edge while $P_2$ is in front of $P_1$ below the edge. Also as previously explained, when the signs of $c_1$ and $c_2$ are different, the sense of the test is reversed. As with the other cases, two more truth tables are available for the third case, as follows:

Polygon Having Priority Above the Edge

|  | Signs of $c_1$ and $c_2$ the same? | |
|---|---|---|
| | yes | no |
| Sign of B  + | $P_1$ | $P_2$ |
| Sign of B  − | $P_2$ | $P_1$ |

Polygon Having Priority Below the Edge

|  | Signs of $c_1$ and $c_2$ the same? | |
|---|---|---|
| | yes | no |
| Sign of B  + | $P_2$ | $P_1$ |
| Sign of B  − | $P_1$ | $P_2$ |

As before, the polygon taking precedence for a specific elemental designation (subpixel) is indicated in accordance with the signs of $c_1$ and $c_2$ and the signs of the values A, B, and C. Thus, it is apparent that this test affords an exceedingly simple approach to the resolution of pixel-by-pixel or subpixel-by-subpixel polygon priority. As indicated above, though polygons in the form of triangles have been described in detail, the concept has application to other primitives utilized in the composition of display images. For example, the concept may be applied to circles, which are perspective projections of spheres.

An implementation of the techniques explained above involves structure for scan converting a polygon to determine the pixels it occupies and computing the subpixels occupied by the polygon within a given pixel. Scan conversion apparatus is utilized as well known in the prior art and as described on page 229 of the referenced book, "Principles of Interactive computer Graphics".

Essentially, scan conversion utilizes the screen space representation of the boundary edges of the polygon, as well as the x,y coordinates of the pixels, to determine the pixels occupied by a polygon. As each pixel is thus determined, the subpixels occupied by the polygon are computed by subpixel computation apparatus, as well known in the prior art and somewhat as described on page 146 of a paper entitled, "A Parallel Scan Conversion Algorithm with Anti-Aliasing for a General-Purpose Ultracomputer", by Eugene Fiume, Alain Fournier and Larry Rudolph, appearing in *Computer Graphics*, published in 1984 by the Association for Computing Machinery, Inc. This subpixel computation also utilizes the screen space representation of the boundary edges of the polygon, as well as the x,y coordinates of the pixels.

Figure 5:
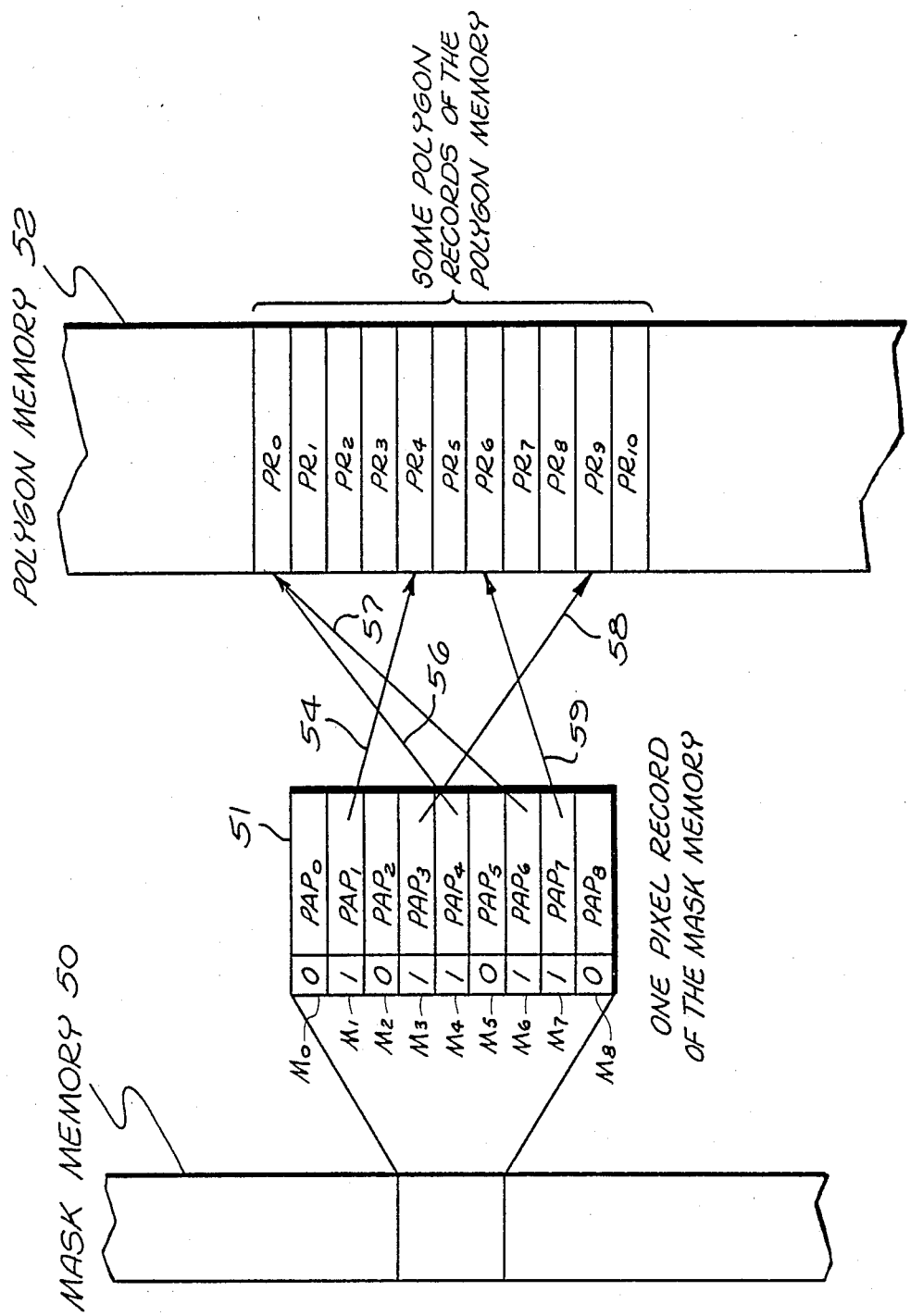
FIG. 5 is a block and symbolic diagram of a component of a system in accordance with the present invention.

In accordance with the idealized format explained above, each pixel is subdivided into nine subpixels (see FIG. 4). Accordingly, for a conventional display, storage is needed for nine subpixels in each of one million pixels, thus storage for nine million subpixels is required. FIG. 5 illustrates this storage structure, which includes both a mask memory and a polygon memory.

A mask memory would provide storage for the subpixels, organized as one million pixel records, each providing storage for nine subpixels. The one million pixels form a two-dimensional array, comprising one thousand rows each having one thousand pixels, at the screen surface S. Accordingly, a particular pixel record is specified within the mask memory using the x,y coordinate, or x,y address, of that pixel. (Note, the x,y coordinate and the x,y address of the pixel are identical.)

A typical pixel record 51 of the mask memory is illustrated in FIG. 5 for storing a single pixel, i.e. nine subpixels. The pixel record 51 includes nine words. Each of the words accommodates a mask bit (designated as $M_0$, $M_1$, $M_2$ ... $M_8$) and a polygon address pointer (designated as $PAP_0$, $PAP_1$, $PAP_2$ ... $PAP_8$). The mask bits indicate whether each subpixel has been assigned to a polygon. If a mask bit is set to "zero", the subpixel has not been assigned to a polygon. If, however, a mask bit is set to "one", the subpixel has been assigned to the polygon identified by the contents of the polygon address pointer. That is, the polygon address pointer contains the address of a polygon record within the polygon memory 52. The particular polygon record specified by this address contains information specific to the polygon to which the subpixel has been assigned. For example, the polygon record specified may contain the coefficients a, b, c and d of the plane equation of the polygon as represented in equation (1). In addition, the polygon record may contain shading information relevant to the polygon, such as Gouraud intensities associated with the vertices of the polygon. Indeed, each polygon record may contain information specific to a graphics primitive other than a polygon, i.e. a sphere, a cylinder, a parametric surface, and so forth. And each polygon record may contain information specific to a graphics primitive different than that of another polygon record. Thus, the various polygon records may contain information specific to any combination of these different types of graphics primitives, so as to allow the simultaneous rendering and display of different types of graphics primitives. In an analogous manner, each polygon record may contain information specific to a shading model different from the Gouraud shading model, i.e. a Phong shading model, or a ray-tracing shading model. In this way, different shading models may be accomplished in the same scene. Thus, the information stored in the polygon record may be quite general.

With reference to FIG. 4 and the earlier mention of a subpixel numbering convention, it can be seen that the convention allows a physical interpretation of the mask bits of the polygon record. The mask bits $M_0$, $M_1$, $M_2$, ... $M_8$ correspond to subpixels 0, 1, 2, ... 8, respectively. A digital representation of the subpixels may be defined by a nine-bit word, wherein the bit $M_0$ is the leftmost bit of the word, the bit $M_1$ is the next bit to the right, and so on, the bit $M_8$ being the rightmost bit of the word. Thus, the mask bits $M_0$, $M_1$, $M_2$, ... $M_8$ depicted in FIG. 5 may be represented by a nine-bit word which reads, 010110110. Such a nine-bit word is designated as a mask.

An illustrative example of the utilization of the mask memory 50 and the polygon memory 52 is depicted in FIG. 5. The mask bit $M_0$ is set to "zero", indicating that the subpixel has not been assigned to any polygon. The mask bit $M_1$ is set to "one", indicating that the polygon address pointer $PAP_1$ contains the address of polygon record $PR_4$ within the polygon memory 52, as shown by arrow 54. Thus, the structure would indicate that the subpixel 1 of the pixel record has been assigned to the polygon $P_4$. Similarly, mask bits $M_3$, $M_4$, $M_6$ and $M_7$ indicate that polygon address pointers $PAP_3$, $PAP_4$, $PAP_6$ and $PAP_7$, respectively, contain the addresses of polygon records $PR_9$, $PR_1$, $PR_1$ and $PR_6$, respectively, as as shown by arrows 58, 56, 57 and 59, respectively. The fact that polygon address pointers $PAP_4$ and $PAP_6$ both contain the address of the polygon record $PR_1$ indicates that subpixels 4 and 6 both have been assigned to the polygon $P_1$.

Note that each polygon record of the polygon memory provides storage for information specific to one particular polygon. Note also that the information specific to one particular polygon is represented in one polygon record only. Thus the total number of polygon records required in the polygon memory equals the total number of polygons to be processed by the hidden surface algorithm. In this regard, the polygon memory 52 depicted in FIG. 5 represents only a very small fraction of the polygon memory required to process a complex model comprising several thousand polygons.

Figure 6:
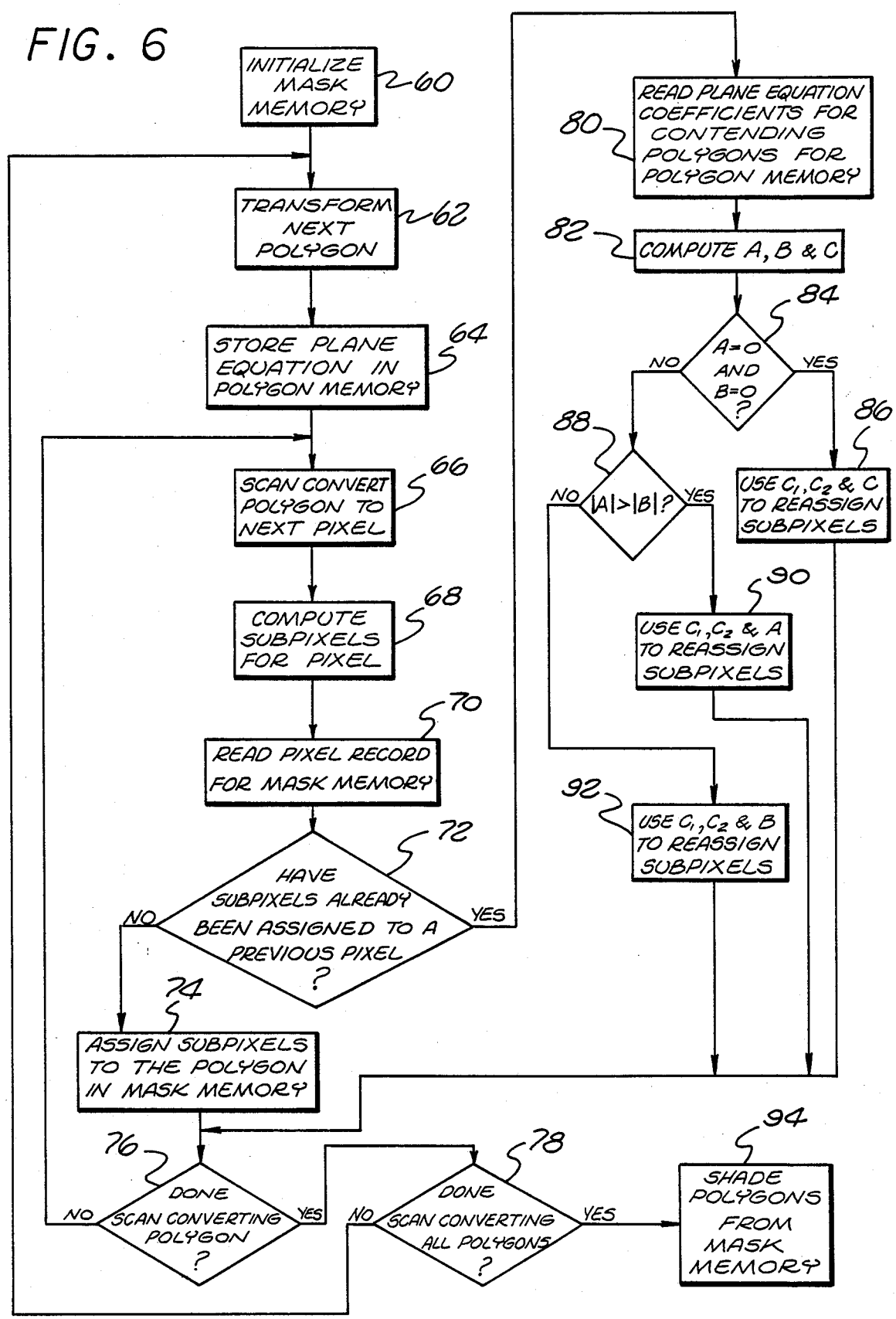
FIG. 6 is a flow diagram of a process in accordance with the present invention.

FIG. 6 depicts the sequence of operations by which the hidden surface algorithm proceeds and by which information is stored in the mask memory and the polygon memory. Computation begins with initialization of the mask memory, as indicated by the block 60. During initialization, all nine million mask bits of the mask memory are set to "zero" to indicate that no subpixels have been assigned to any polygon. Then the first polygon, designated as $P_1$, is transformed from world space into perspective space (by transformation apparatus) as indicated by the block 62. The a, b, c and d coefficients of the plane equation of $P_1$ are stored in the first available polygon record of the polygon memory 52, as indicated by the block 64. This polygon record is designated as $PR_1$.

Next, $P_1$ is scan converted by scan conversion apparatus to determine the pixels to be occupied by $P_1$. During the execution of this algorithm, scan conversion proceeds one pixel at a time, as indicated by the block 66. As each pixel to be occupied by $P_1$ is determined by the scan conversion apparatus, the subpixels to be occupied by $P_1$ within that pixel are computed by subpixel computation apparatus, as indicated by the block 68. But these subpixels may not be assigned to $P_1$ within the storage of the mask memory 50 until a check is made to determine whether the subpixels in question have been assigned to a previously processed polygon. Accordingly, the pixel record specific to the pixel in question is read from the mask memory, as indicated by the block 70.

Each of the mask bits corresponding to the subpixels in question is checked to see if any of them are set to "one", indicating assignment to a previous polygon, as indicated by the query posed in the diamond 72. But because $P_1$ is the first polygon processed since initialization when all of the mask bits were set to "zero", this check reveals that none of the mask bits corresponding to the subpixels in question are set to "one". Accordingly, all of the mask bits corresponding to the subpixels in question may now be set to "one", and each polygon address pointer (PAP) associated with these mask bits may now be loaded with $PR_1$, the address in the polygon memory of the polygon record where the plane equation coefficients of $P_1$ have been stored. This action, indicated by the block 74, designates that the subpixels in question are indeed occupied by, and have been assigned to, the polygon $P_1$.

Next, a test is made to determine whether scan conversion of $P_1$ is finished, as indicated by the diamond 76. If scan conversion of $P_1$ is not finished, scan conversion of $P_1$ continues to the next pixel to be occupied by $P_1$, as indicated by the block 66. If scan conversion of $P_1$ is finished, a test is made to determine whether more polygons are to be scan converted, as indicated by the diamond 78.

If more polygons are to be scan converted, processing of the next polygon, designated as $P_2$, may begin. First, $P_2$ is transformed from world space into perspective space by transformation apparatus, as indicated by the block 62. The a, b, c and d coefficients of the plane equation of $P_2$ are stored in the next available polygon record of the polygon memory 52, as indicated by the block 64. This polygon record is designated as $PR_2$. Next, $P_2$ is scan converted by scan conversion apparatus to determine the pixels to be occupied by $P_2$, as indicated by the block 66.

As each pixel to be occupied by $P_2$ is determined by the scan conversion apparatus, the subpixels to be occupied by $P_2$ within that pixel are computed by subpixel computation apparatus, as indicated by the block 68. But these subpixels may not be assigned to $P_2$ within the storage of the mask memory 50 until a check is made to determine whether the subpixels in question have been assigned to a previously processed polygon. Accordingly, the pixel record specific to the pixel in question is read from the mask memory, as indicated by the block 70. Each of the mask bits corresponding to the subpixels in question is checked to see if any of them are set to "one", indicating assignment to a previous polygon, as indicated by the query posed in the diamond 72. If none of these mask bits have been assigned previously to $P_1$, they may now all be assigned to $P_2$, in a manner analogous to that in which mask bits were assigned to $P_1$ as described above, and as indicated by the block 74.

However, if some of these mask bits have been assigned previously to $P_1$, then $P_1$ and $P_2$ are said to contend for the previously assigned mask bits. In this case, the determination of polygon priority must be accomplished as now described. The plane equation coefficients $a_1$, $b_1$, $c_1$ and $d_1$ of $P_1$ and $a_2$, $b_2$, $c_2$ and $d_2$ of $P_2$, respectively, are read from the polygon records $PR_1$ and $PR_2$ of the polygon memory, as indicated by the block 80. These coefficients are combined as in equation (2) to produce the edge equation coefficients A, B and C of the edge determined by the intersection of the two planes, as indicated by the block 82. Then the signs of $c_1$, $c_2$ and A, B or C are used in accordance with the appropriate truth tables (described above) to determine which of the mask bits previously assigned to the polygon $P_1$ will be reassigned to the polygon $P_2$. This reassignment begins with a test of whether A and B are both equal to zero, as indicated by the diamond 84. If A and B are both equal to zero, the two planes are parallel, and reassignment will occur contingent upon the signs of $c_1$, $c_2$ and C, as indicated by the block 86. If A and B are not both equal to zero, then a test of whether the absolute value of A exceeds the absolute value of B is conducted, as indicated by the diamond 88. If the absolute value of A exceeds the absolute value of B, then the two planes intersect along more vertical edge and reassignment will occur contingent upon the signs of $c_1$, $c_2$ and A, as indicated by the block 90. However, if the absolute value of A does not exceed the absolute value of B, then the two planes intersect along a more horizontal edge and reassignment will occur contingent upon the signs of $c_1$, $c_2$ and B, as indicated by the block 92.

Thus, the signs of $c_1$, $c_2$ and A, B or C are used to determine which of the mask bits previously assigned to the polygon $P_1$ are to be reassigned to the polygon $P_2$, as indicated by the blocks 86, 90 and 92. These mask bits are reassigned by changing their associated polygon address pointers (PAP) from $PR_1$ to $PR_2$.

Next, a test is made to determine whether scan conversion of $P_2$ is finished, as indicated by the diamond 76. If scan conversion of $P_2$ is not finished, scan conversion of $P_2$ continues to the next pixel to be occupied by $P_2$, as indicated by the block 66. If scan conversion of $P_2$ is finished, a test is made to determine whether more polygons are to be scan converted, as indicated by the diamond 78. If more polygons are to be scan converted, processing of the next polygon, designated as $P_3$, may begin. Processing of $P_3$ proceeds in a manner analogous to that of $P_2$. At a given subpixel, $P_3$ may be found to contend with $P_1$ or $P_2$, and determination of polygon priority will then be accomplished as described above. When all of the pixels to be occupied by $P_3$ have been processed in this manner, polygons $P_4$, $P_5$, ... $P_m$ will be processed in sequence, where $P_m$ designates the last polygon to be processed. When $P_m$ has been processed, the mask memory 50 and the polygon memory 52 together contain a record of the polygons occupying specific subpixels within each of the one million pixel records. Thus, the hidden surface algorithm has been accomplished, and shading may begin as indicated by the block 94.

Polygons may be shaded using the information stored in the mask memory 50, provided that polygon shading information, such as Gouraud intensity information, has been stored in the polygon memory 52. To shade a particular pixel, a shading apparatus may access the particular pixel record in mask memory to obtain a description of polygons occupying specific subpixels within that pixel. This description may be used to compute scaled polygon shades for that pixel, and these shades may be used to set the intensity stored for that pixel in a video frame buffer. For example, FIG. 5 depicts mask bits $M_1$, $M_3$, $M_4$, $M_6$ and $M_7$ set to "one" indicating that polygon address pointers $PAP_1$, $PAP_3$, $PAP_4$, $PAP_6$ and $PAP_7$ contain valid address pointers into the polygon memory; specifically, they contain the addresses of polygon records $PR_4$, $PR_9$, $PR_1$, $PR_1$ and $PR_6$, respectively. A simple shading algorithm utilizing this information is presented as follows. First, the shading apparatus reads mask bit $M_0$, determines that it is set to "zero", and moves on to the next mask bit. The next mask bit, $M_1$, is set to "one", so the shading apparatus uses the associated polygon address pointer, $PAP_1$, as an address to read the polygon memory and retrieve the polygon record $PR_4$. Stored in $PR_4$ is the Gouraud intensity information necessary for computing the Gouraud shade of the polygon $P_4$. Accordingly, the shading apparatus computes the Gouraud shade of $P_4$ at the pixel, scales this shade by 1/9 (the fraction of the pixel occupied by subpixel 1), and adds this result to the pixel in question in the frame buffer. The shading apparatus then moves on to the next subpixel. When the shading apparatus has completed processing the pixel record depicted in FIG. 5, the polygons $P_4$, $P_9$, $P_1$ and $P_6$ will have contributed shades scaled by 1/9, 1/9, 2/9 and 1/9 to the intensity of the pixel stored in a frame buffer.

The above algorithm serves only to illustrate the use of subpixel information in shading. Sophisticated application of subpixel information in shading, including filtering by area sampling, is well known in the prior art and is described in the two above-referenced papers entitled, "The A-buffer, an Anti-aliased Hidden Surface Method" and "A Parallel Scan Conversion Algorithm with Anti-Aliasing for a General-Purpose Ultracomputer". However, the above discussion points out that all polygon edges, i.e. polygon boundary edges as well as edges created by the intersection of polygons, are processed using subpixels and therefore may be processed to accomplish anti-aliasing using sophisticated techniques such as area sampling.

Figure 7:
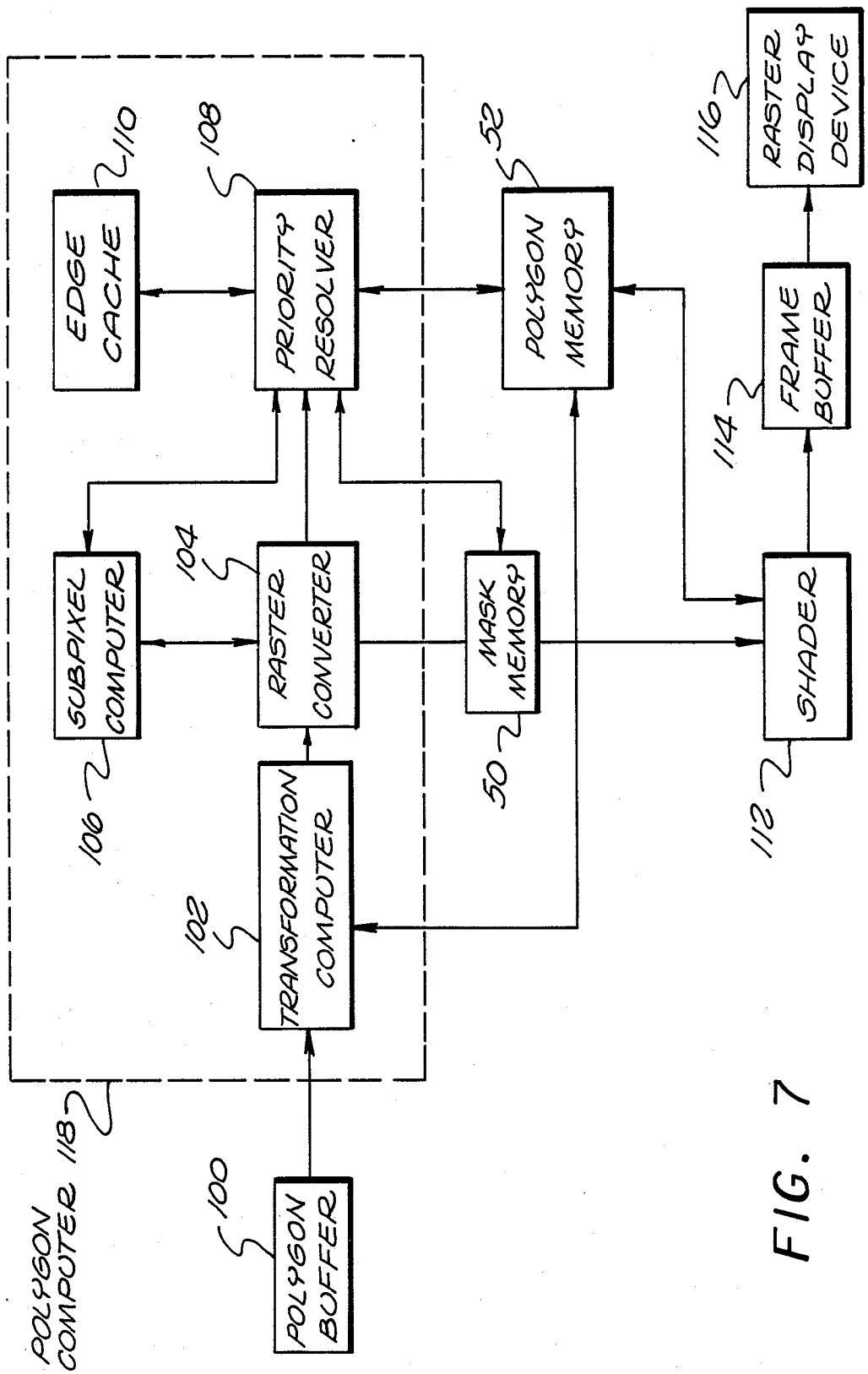
FIG. 7 is a block diagram of a system embodying structure in accordance with the present invention.

The hidden surface algorithm as illustrated in FIG. 6 may be variously executed and implemented. In that regard, FIG. 7 illustrates a general implementation of the system of the present invention in the environment of conventional computer graphics elements. A polygon buffer 100 stores polygon data for several thousand polygons defined in world space. The data for each polygon may be accessed and processed, in sequence, by a transformation computer 102 (as well known in the art) to accomplish intensity calculations, perspective transformation, clipping and viewport mapping as well as various other processes as well known in the prior art. The polygon in process during a specific time interval is designated as the new polygon.

Data processed as indicated above is supplied from the transformation computer 102 to the polygon memory 52 and to a raster converter 104. Specifically, the transformation computer 102 supplies the Gouraud intensities at the vertices of the new polygon and the perspective space representations of the coefficients a, b, c and d defining the new polygon plane equation to the polygon memory for storage in the next available polygon record. The address in polygon memory of that polygon record, designated as the new polygon address or NPA, is returned to the transformation computer. The transformation computer then supplies NPA, and other relevant polygon data, such as the screen space representations of the new polygon boundary edges, to the raster converter.

The raster converter 104 determines, in sequence, the pixels to be occupied by the new polygon. The converter may take a known form as disclosed in the referenced book, "Principles of Interactive Computer Graphics", see Section 16-2, "Scan Converting Polygons".

Each determined pixel is specified using an x,y address, which is identical to the pixel's x,y coordinate. For each such pixel, the raster converter provides the x,y address, as well as the new polygon boundary edges, to a subpixel computer 106. Using this information, the subpixel computer 106 calculates the subpixels to be occupied by the polygon within the pixel in question.

The computed subpixel information is represented by a nine-bit word as explained above, i.e. one bit for each of the nine subpixels, and is designated as the new polygon mask or NEWM. The NEWM is transmitted back to the raster converter.

During the same time NEWM is calculated by the subpixel computer 106, the raster converter 104 provides the x,y address for the pixel in question to the mask memory 50 and reads from the mask memory one pixel record accordingly. As described above, the mask bits of this pixel record are assembled into a nine-bit word describing which subpixels are occupied in that pixel by previously processed polygons. The word is designated as the old polygon mask or OLDM. The raster converter then tests for contention for subpixels by simply calculating the logical AND operation between NEWM and OLDM. The result of this logical AND operation is designated as the contention mask, or CONM. The CONM indicates the subpixels for which there is contention between the new polygon and the previously processed polygons.

If CONM contains "zero", then there is no contention for the subpixels, and they may be assigned to the new polygon. For example, assume that NEWM contains 101000000. Further assume that OLDM is loaded from the pixel record depicted in FIG. 5, and hence contains 010110110. Then the logical AND between NEWM and OLDM is 000000000, which result is loaded into CONM. Since CONM contains 000000000, there is no contention for the subpixels. Therefore, the subpixels will be assigned to the new polygon.

A more direct structure for determining which of the subpixels specified by NEWM may be assigned to the new polygon is as follows. The raster converter computes the logical AND between NEWM and the logical NOT of OLDM. The result of this sequence of operations is designated the free mask or FREM. The FREM designates free, or unassigned, subpixels which may be assigned to the new polygon. For the above example, the logical NOT of OLDM is 101001001, so the logical AND between NEWM and the logical NOT of OLDM is 101000000, which result is loaded in FREM. The bits of FREM which are set to "one" specify subpixels which may be assigned to the new polygon. Thus, since FREM contains 101000000, subpixels 0 and 2 may be assigned to the new polygon. This is accomplished by the raster converter 104, which performs a write operation on the pixel record in the mask memory 50 in order to modify some of the mask bits and some of the polygon address pointers of the pixel record as follows. First the raster converter 104 computes the logical OR between the free mask FREM and the old polygon mask OLDM and stores this result into the mask bits of the pixel record. Thus, since FREM contains 101000000 and OLDM contains 010110110, the raster converter writes 111110110 into the mask bits of the pixel record, effectively setting the mask bits $M_0$ and $M_2$ to "one". Next, the raster converter modifies the polygon address pointers of the pixel record as follows. Each polygon address pointer specified by a nonzero bit of FREM is loaded with the new polygon address NPA. Thus, since bits 0 and 2 of FREM are set to "one", the polygon address pointers $PAP_0$ and $PAP_2$ are loaded with the new polygon address NPA. These modifications effectively assign subpixels 0 and 2 to the new polygon. At this point, the pixel in question has been processed, and the raster converter 104 proceeds to determine the next pixel to be occupied by the polygon.

If CONM does not contain "zero", there is contention for the subpixels, and they may not be assigned to the new polygon prior to determination of polygon priority. For example, assume the NEWM contains 000010100 and that OLDM contains 010110110 as before. Then CONM, computed as the logical AND between NEWM and OLDM, is 000010100, indicating contention for subpixel bits 4 and 6. Alternately, FREM, computed as the logical AND between NEWM and the logical NOT of OLDM, is 000000000, indicating that no subpixels may be assigned to the new polygon prior to determination of polygon priority. Polygon priority is determined as follows.

Since bits 4 and 6 of CONM are set to "one", the raster converter examines the polygon address pointers $PAP_4$ and $PAP_6$ of the pixel record (see FIG. 5). These polygon address pointers contain the address of the polygon record $PR_1$, indicating the subpixels 4 and 6 are assigned to the polygon $P_1$. That is to say, there is contention for subpixels 4 and 6 between the new polygon and the polygon $P_1$. In this case, the raster converter 104 provides data required for the determination of polygon priority to the priority resolver 108. Specifically, the raster converter provides the contention mask CONM, the new polygon address NPA, the polygon address pointer $PAP_4$ (or alternately the polygon address pointer $PAP_6$, which contains the same information), and the pixel x,y address (identical to the pixel x,y coordinate) to the priority resolver. This data specifies two polygons indicated by NPA and $PAP_4$ which contend for the subpixels indicated by CONM within the pixel indicated by the pixel x,y address.

A priority resolver 108 determines the polygon priority between the contending polygons, within the pixel in question, and expresses this result as a priority award mask PAWM. The priority resolver essentially implements the algorithms as described above mathematically.

The bits of PAWM which are set to "one" specify subpixels in which the new polygon is awarded priority over the polygon $P_1$. Accordingly, PAWM will be used to specify subpixels currently occupied by the polygon $P_1$ which will be reassigned to the new polygon. PAWM is computed as follows. First, the priority resolver applies $PAP_4$ as an address to the polygon memory 52 and reads the coefficients of the plane equation of the polygon $P_1$, designated as $a_1$, $b_1$, $c_1$ and $d_1$. Next, the priority resolver applies NPA as an address to the polygon memory and reads the coefficients of the plane equation of the new polygon, designated as $a_2$, $b_2$, $c_2$ and $d_2$. The designation of the plane equation coefficients of the new polygon with the subscript "2" indicates that the new polygon will be used as polygon $P_2$ when using the truth tables (described above). The priority resolver computes the coefficients A, B and C of the edge of intersection of the two planes, as indicated in equation (2). It then provides these coefficients defining the edge, as well as the pixel x,y coordinate, to the subpixel computer 106. The subpixel computer then determines which subpixels within the pixel lie on the "inside" of the edge, and specifies these subpixels by a nine-bit edge mask, designated as EDGM. The convention whereby an edge has an "inside" and an "outside" is well known in the prior art, and is described on page 146 of the paper entitled, "A Parallel Scan Conversion Algorithm with Anti-Aliasing for a General-Purpose Ultracomputer". A representative EDGM may be obtained by referring to FIG. 4. Note that subpixels 0, 3 and 6 lie to the left side of the edge 18a, whereas the subpixels 1, 2, 4, 5, 7 and 8 lie to the right side of the edge 18a. If by convention the left side of the edge is designated as the "inside", then EDGM will be loaded with 100100100 by the subpixel computer, specifying that subpixels 0, 3 and 6 lie on the "inside" of the edge. The subpixel computer 106 then transmits EDGM to the priority resolver 108.

Recapitulating to some extent, EDGM contains a specification of the subpixels which lie on the "inside" of the edge of intersection of the planes of the contending polygons $P_1$ (the previously processed polygon) and $P_2$ (the new polygon). The priority resolver processes EDGM to compute the subpixels in which the polygon $P_2$ is in front of the polygon $P_1$, and specifies these subpixels via a nine-bit word designated as the priority mask PRIM. This computation uses the truth tables and the signs of $c_1$, $c_2$ and A, B or C to compute these subpixels. For example, assume the edge is a more vertical edge as depicted in FIG. 4. Then the truth tables using the signs of $c_1$, $c_2$ and A are required for the computation.

Assume that the signs of $c_1$ and $c_2$ are the same and that the sign of A is positive. Referral to the truth table entitled, "Polygon Having Priority on the Left Side of the Edge" reveals that in this case the polygon $P_2$ has priority on the left side of the edge. Since EDGM also specifies subpixels on the left side of the edge, the priority resolver loads EDGM into PRIM. This action indicates that the subpixels on the left side of the edge, i.e. subpixels 0, 3 and 6, are the subpixels in which the polygon $P_2$ is in front of the polygon $P_1$. Thus, PRIM now contains 100100100.

Assume, however, that the signs of $c_1$ and $c_2$ are not the same and that the sign of A is positive. Referral to the truth table entitled, "Polygon Having Priority on the Right Side of the Edge" reveals that in this case the polygon $P_2$ has priority on the right side of the edge. Since EDGM specifies subpixels on the left side of the edge, the priority resolver loads the logical NOT of EDGM into PRIM. This action indicates that the subpixels on the right side of the edge, i.e. subpixels 1, 2, 4, 5, 7 and 8, are the subpixels in which the polygon $P_2$ is in front of the polygon $P_1$. Thus, PRIM now contains 011011011. In the present example, these contents of PRIM will be used in subsequent computations.

At this point, the priority mask PRIM contains a description of the subpixels in which the polygon $P_2$ is in front of the polygon $P_1$, within the pixel in question. The priority resolver 108 must now compute a description of only those subpixels over which there is contention between the polygons $P_1$ and $P_2$ and in which the polygon $P_2$ is in front of the polygon $P_1$. This description is designated as the priority award mask PAWM (see above). The priority resolver computes PAWM as the logical AND between the contention mask CONM and the priority mask PRIM. Assume that CONM contains 000010100 and that PRIM contains 011011011 (both as above). Then the priority resolver loads PAWM with 000010000.

The bits of PAWM which are set to "one" specify subpixels which may be reassigned to the new polygon. Thus, since PAWM contains 000010000, subpixel 4 may be reassigned to the new polygon. This reassignment is accomplished by the priority resolver 108, which performs a write operation on the pixel record in the mask memory 50 in order to modify one of the polygon address pointers of the pixel record as follows. Each polygon address pointer specified by a nonzero bit of PAWM is loaded with the new polygon address NPA. Thus, since bit 4 of PAWM is set to "one", the polygon address pointer $PAP_4$ is loaded with NPA. This modification effectively assigns subpixel 4 to the new polygon. At this point, the pixel in question has been processed, and the raster converter 104 proceeds to determine the next pixel to be occupied by the polygon.

The examples discussed to this point produced nonzero contents for either the free mask FREM or the contention mask CONM, but not of both masks. It is possible to produce nonzero contents for both FREM and CONM. For example, assume that the new polygon mask NEWM contains 100000010. Further assume that the old polygon mask OLDM is loaded from the pixel record depicted in FIG. 5, and hence contains 010110110. Then FREM, computed as the logical AND between NEWM and the logical NOT of OLDM, contains 100000000. Further, CONM, computed as the logical AND between NEWM and OLDM, contains 000000010. In this case, FREM directs the scan converter 104 to assign subpixel 0 to the new polygon. Further, the scan converter provides CONM to the priority resolver 108, directing it to determine whether to reassign subpixel 7 from $P_6$ to the new polygon.

Also, the examples discussed to this point produced contention for subpixels between the new polygon and only one previously processed polygon. It is possible to produce cases where there is contention between the new polygon and several previously processed polygons. For example, assume that the new polygon mask NEWM contains 010100100. Further assume that the old polygon mask OLDM is loaded from the pixel record depicted in FIG. 5, and hence contains 010110110. Then CONM, computed as the logical AND between NEWM and OLDM, contains 010100100. The contents of CONM indicate that there is contention between the new polygon and three previously processed polygons (see FIG. 5). In subpixel 1 there is contention with the polygon $P_4$. In subpixel 3 there is contention with the polygon $P_9$. And in subpixel 6 there is contention with the polygon $P_1$. In this case, the raster converter 104 must decompose the composite contention mask CONM into three simple contention masks, one for each of the polygons $P_4$, $P_9$ and $P_1$ and provide each of the three contention masks to the priority resolver 108 in sequence. First, the raster converter produces the contention mask 010000000 and provides it to the priority resolver, directing the priority resolver to determine whether to reassign subpixel 1 from $P_4$ to the new polygon. Next, the raster converter produces the contention mask 000100000 and provides it to the priority resolver, directing the priority resolver to determine whether to reassign subpixel 3 from $P_9$ to the new polygon. Finally, the raster converter produces the contention mask 000000100 and provides it to the priority resolver, directing the priority resolver to determine whether to reassign subpixel 6 from $P_1$ to the new polygon.

Thus, complicated cases of noncontention and of contention may occur, as expressed by the contents of FREM and CONM. The raster converter 104 contains circuitry to decompose these composite cases into simple cases which can be processed by the raster converter 104 and the priority resolver 108.

The general implementation of the system of the present invention illustrated in FIG. 7 includes an edge cache 110 which is utilized to facilitate polygon priority determination as follows. FIG. 2 illustrates triangles 10 and 12 which interpenetrate one another and which overlap one another within a large number of pixels. Assume that the triangle 10, designated as the polygon $P_{10}$, has been processed previously by the system illustrated in FIG. 7, and therefore is represented in a large number of pixel records in the mask memory 50. Further assume that the triangle 12, designated as the polygon $P_{12}$, is currently being processed by the raster converter 104 to determine the pixels it occupies. At some point during the raster conversion of $P_{12}$, it is found to be in contention with $P_{10}$ within a given pixel, for example, the pixel 32. Assume that the pixel 32 is the first pixel within which contention between $P_{10}$ and $P_{12}$ is discovered. At this point, the raster converter directs the priority resolver 108 to determine the polygon priority between $P_{10}$ and $P_{12}$, and provides the priority resolver with the addresses in the polygon memory 52 of the polygon records containing data for $P_{10}$ and $P_{12}$. Accordingly, the priority resolver reads the plane equation coefficients $a_{10}$, $b_{10}$, $c_{10}$ and $d_{10}$ for $P_{10}$, and the plane equation coefficients $a_{12}$, $b_{12}$, $c_{12}$ and $d_{12}$ for $P_{12}$, from the polygon memory. Then the priority resolver computes the coefficients A, B and C of the intersection edge 18a of the two planes. Once having accessed the polygon memory and computed the intersection edge, the priority resolver, aided by the subpixel computer, may complete the processing of the pixel by determining whether any subpixels assigned to $P_{10}$ may be reassigned to $P_{12}$. When processing of the pixel is completed, the raster converter 104 continues the raster conversion of $P_{12}$ to determine which other pixels $P_{12}$ occupies.

At some other point during the raster conversion of $P_{12}$, it will be found to be in contention with $P_{10}$ within another pixel, for example, the pixel 36. At this point, the raster converter will direct the priority resolver 108 to determine the polygon priority between $P_{10}$ and $P_{12}$. Accordingly, the priority resolver will again read the plane equation coefficients $a_{10}$, $b_{10}$, $c_{10}$ and $d_{10}$ for $P_{10}$, and the plane equation coefficients $a_{12}$, $b_{12}$, $c_{12}$ and $d_{12}$ for $P_{12}$, from the polygon memory 52. Then the priority resolver will again compute the coefficients A, B and C of the intersection edge 18a of the two planes. But these accesses to the polygon memory and this computation of the intersection edge 18a will be redundant; they have already been performed previously. And they will be repeated for each of the numerous pixels within which $P_{10}$ and $P_{12}$ will be found to be in contention.

However, it is possible to avoid repeating these accesses to the polygon memory and this edge computation, as follows. At the first instance of the computation of the edge 18a, i.e. when $P_{10}$ and $P_{12}$ are in contention within the pixel 32, the coefficients A, B and C of the edge are stored in the edge cache 110. The edge cache is a cache memory, as well known in the prior art and as described on pages 314–321 of the referenced book, "Computer Systems Architecture", Baer, 1980, Computer Science Press, Inc. This edge cache is organized in such a manner as to permit the storage and retrieval of edge coefficients, where those edge coefficients may be stored and retrieved only through providing the edge cache an access code for a pair of polygons. For example, for the pair of polygons $P_{10}$ and $P_{12}$, the access code may be obtained by concatenating information unique to these two polygons. Thus, a suitable access code is the concatenation of the two addresses in the polygon memory of the polygon records containing data for $P_{10}$ and $P_{12}$. Recapitulating, at the first instance of the computation of the edge 18a, i.e. when $P_{10}$ and $P_{12}$ are in contention within the pixel 32, the coefficients A, B and C of the edge 18a are stored in the edge cache accessed using the access code for $P_{10}$ and $P_{12}$. Then, at a future moment when $P_{10}$ and $P_{12}$ are in contention within another pixel, for example the pixel 36, the coefficients A, B and C of the edge 18a are retrieved from the edge cache, again accessed using the access code for $P_{10}$ and $P_{12}$. Use of the edge cache in this manner avoids repeating the accesses to the polygon memory 52 and the computation of the coefficients A, B and C for each pixel within which $P_{10}$ and $P_{12}$ are in contention. The use of the edge cache is made possible by the fact that the edge 18a is created by the intersection of the planes of polygons $P_{10}$ and $P_{12}$, and applies to all pixels at the screen surface S, not to one pixel only. Therefore, the edge 18a may be utilized for determination of polygon priority between polygons $P_{10}$ and $P_{12}$ for any pixel within which contention between $P_{10}$ and $P_{12}$ occurs.

Thus, whenever a pair of polygons is in contention within a pixel, the priority resolver 108 provides the edge cache 110 an access code for that pair of polygons, and attempts to retrieve the edge coefficients relevant to that pair of polygons. If those edge coefficients have been computed and stored in the edge cache previously, as during a prior instance of contention between the same pair of polygons, then those edge coefficients may be retrieved and utilized by the priority resolver. If, however, those edge coefficients have not been computed and stored in the edge cache previously, as in the case where there has been no prior instance of contention between the same pair of polygons, then the priority resolver must access the polygon memory 52 and compute the edge coefficients. Once the edge coefficients have been computed in this manner, they may be stored in the edge cache using the access code for that pair of polygons. Then, upon a later instance of contention between the same pair of polygons, the edge coefficients may be retrieved using that same access code.

After all of the polygons in the polygon buffer 100 have been processed as described above by the transformation computer 102, the raster converter 104 and the priority resolver 108, the hidden surface algorithm has been accomplished. Thus, the mask memory 50 and the polygon memory 52 together contain a record of the polygons occupying specific subpixels within each of the one million pixel records. At this point, the shader 112 may commence operation. The shader examines each pixel record of the mask memory in sequence. Within a pixel record, for each subpixel for which the mask bit contains "one", the shader examines the associated polygon address pointer to determine the polygon occupying the subpixel (see FIG. 5). The shader then reads the polygon shading information for that polygon, such as Gouraud intensity information, from the polygon memory 52. Next, the shader computes the shade for the polygon within that pixel. Then the shader scales that shade in accordance with the number of the subpixels occupied by the polygon within that pixel. This scaled shade is then added to the intensity stored for that pixel in the frame buffer 114. Similarly, the shade is again scaled in accordance with the number, and the position, of the subpixels occupied by the polygon within that pixel, and added to the intensities stored for surrounding pixels in the frame buffer. This approach to shading accomplishes antialiasing of the polygons through area sampling of the polygons, as well known in the prior art. The result stored in the frame buffer may be viewed on the raster display device 116.

Note that the general implementation of the system of the present invention separates the raster conversion and hidden surface processes from the shading process. This approach may be advantageous in certain situations, as for example when the raster conversion and hidden surface processes are less complex computationally than the shading process. In this case, the shader may be designed to complete the shading process during approximately the same time interval required for the raster conversion and hidden surface processes.

Figure 8:
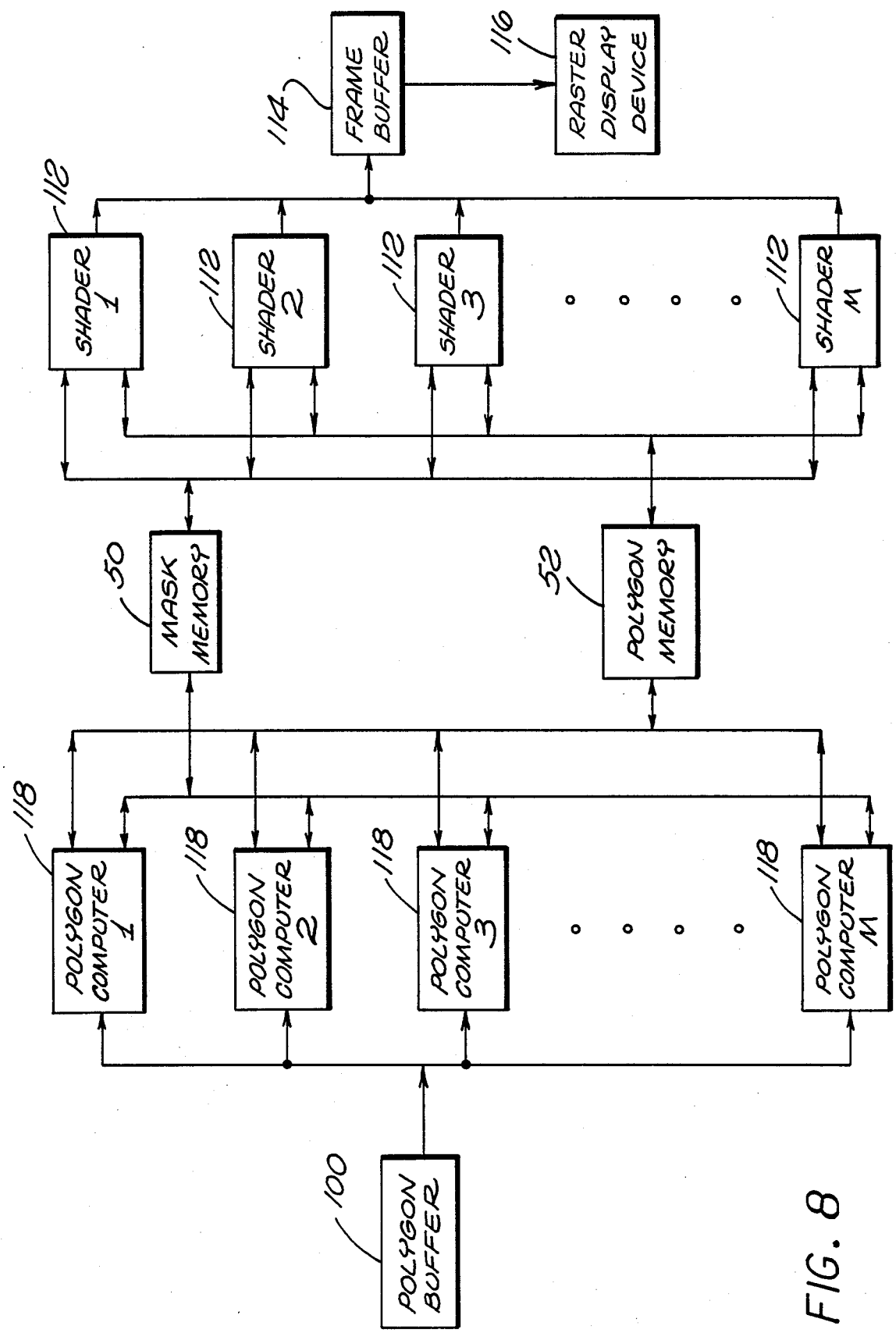
FIG. 8 is a block diagram of another system embodying structure in accordance with the present invention.

The general implementation of the system of the present invention discussed to this point allows for raster conversion and hidden surface processing of polygons in sequence and for shading of pixels in sequence. However, an alternate implementation of the system of the present invention, illustrated in FIG. 8, allows for raster conversion and hidden surface processing of polygons in parallel and for shading of pixels in parallel. A polygon buffer 100 is connected to multiple polygon computers 118. As illustrated in FIG. 7, a polygon computer includes a transformation computer 102, a raster converter 104, a subpixel computer 106, a priority resolver 108 and an edge cache 110. The polygon computers 118 are connected to the mask memory 50 and to the polygon memory 52. The mask memory and the polygon memory are connected to multiple shaders 112. The shaders are connected to a frame buffer 114. The frame buffer is connected to a raster display device 116.

The polygon buffer 100 is used for storage of polygon data for several thousand polygons defined in world space. The data for a single polygon may be accessed and processed by a single polygon computer 118 to accomplish intensity calculations, perspective transformation, clipping and viewport mapping, raster conversion and priority resolution. Note that although a single polygon computer processes only a single polygon during any given time interval, each different polygon computer processes a different polygon during that time interval. Thus, parallel raster conversion of the polygons is made possible through the use of multiple polygon computers.

The parallel implementation of the raster conversion and hidden surface algorithm proceeds as follows. Each polygon computer 118 accesses the polygon buffer 100 in turn and obtains data for the next available, unprocessed polygon. Each polygon computer raster converts its polygon, and in the process modifies pixel records in the mask memory 50 and polygon records in the polygon memory 52. All of the polygon computers function simultaneously, so transactions between a particular polygon computer and the polygon buffer, the mask memory or the polygon memory occur randomly, and are randomly interleaved between similar transactions between the other polygon computers and the polygon buffer, the mask memory or the polygon memory. When a particular polygon computer has completed processing its polygon, it again accesses the polygon buffer and obtains data for the next available, unprocessed polygon, which it then processes. When all of the polygon computers have completed processing their individual polygons, and when no unprocessed polygons remain in the polygon buffer, the hidden surface algorithm has been accomplished.

At this point the multiple shaders 112 may commence operation. Each shader accesses the mask memory in turn and obtains the next available, unprocessed pixel record. As directed by the contents of the pixel record it is processing, each shader accesses the polygon memory to obtain the polygon records for each polygon occupying the pixel. It shades each such polygon and scales and adds the shades thus produced to the intensities stored for the pixel, and to the intensities stored for surrounding pixels, in the frame buffer 114. The scale factor applied to each shade is influenced by the number and the position of subpixels occupied by the polygon, as well as by the specific pixel to receive the intensity data, in accordance with the principles of area sampling. All of the shaders function simultaneously, so transactions between a particular shader and the mask memory, the polygon memory or the frame buffer occur randomly and are randomly interleaved between similar transactions between the other shaders and the mask memory, the polygon memory or the frame buffer. When a particular shader has completed processing a pixel record, it accesses the mask memory and obtains data for the next available, unprocessed pixel record, which it then processes. When all of the shaders have completed processing their individual pixel records and when no unprocessed pixel records remain in the mask memory, the result stored in the frame buffer may be viewed on the raster display device 116.

Figure 9:
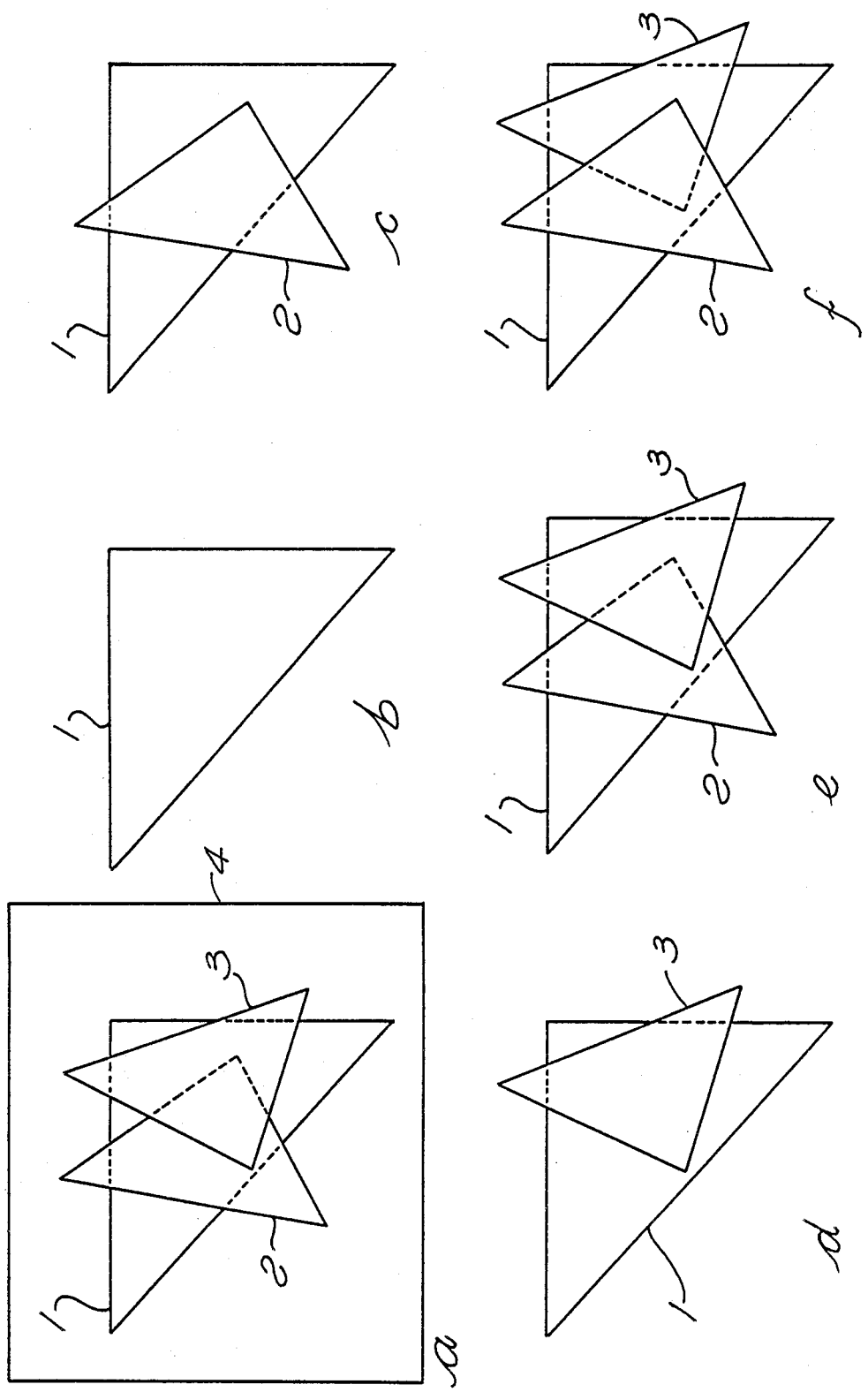
FIGS. 9a-f are graphic views of three polygons displayed within a pixel for analysis in accordance with the present invention.

In order to permit a parallel implementation of the raster conversion and hidden surface algorithm, the transactions between the polygon computers 118 and the mask memory 50 must be of a slightly more sophisticated nature than indicated during the preceding discussion of a sequential implementation of the raster conversion and hidden surface algorithm. For example, FIG. 9a illustrates triangles 1, 2 and 3 which overlap one another within the pixel 4. For simplicity, the partitioning of the pixel into subpixels is not shown, however, it is to be understood that the area occupied within the pixel by each triangle is accurately encoded using subpixels. The triangles 1, 2 and 3 will be designated as $P_1$, $P_2$ and $P_3$. FIG. 9a shows that $P_3$ is the frontmost polygon, that $P_2$ is behind $P_3$ and that $P_1$ is behind both $P_2$ and $P_3$.

The processing of $P_1$, $P_2$ and $P_3$ will now be discussed, following a short introduction of the nomenclature to be used in the discussion. The polygon stored in the pixel record of mask memory 50 is designated as the old polygon, or $P_o$. The polygon being raster converted is designated as the new polygon, or $P_n$. The polygon computer 118 performing the raster conversion is designated as $PC_n$. The priority award mask computed by $PC_n$ in response to the contention between $P_o$ and $P_n$ is designated as $PAWM_{n,o}$, and is used to reassign mask bits from $P_o$ to $P_n$.

Assume that $P_1$ has already been raster converted, and therefore is represented in the mask memory, as indicated in FIG. 9b. Further assume that a polygon computer 118, designated as $PC_2$, is in the process of raster converting $P_2$ and that another polygon computer, designated as $PC_3$, is in the process of raster converting $P_3$. At some point during the raster conversion of $P_2$, contention for subpixels will occur between $P_2$ and $P_1$ within the pixel 4. FIG. 9c shows the correct resolution of the contention, which will be computed by $PC_2$, encoded as priority award mask $PAWM_{2,1}$ and stored in the mask memory 50. Similarly, at some point during the raster conversion of $P_3$, contention for subpixels will occur between $P_3$ and $P_1$ within the pixel 4. FIG. 9d shows the correct resolution of the contention, which will be computed by $PC_3$, encoded as priority award mask $PAWM_{3,1}$, and stored in the mask memory.

Now, consider an exemplary sequence of events occurring during the raster conversion of $P_2$ and $P_3$. First, $PC_2$ detects contention between $P_2$ and $P_1$, computes $PAWM_{2,1}$, and reassigns the subpixels indicated by $PAWM_{2,1}$ from $P_1$ to $P_2$. The pixel record in mask memory is now as shown in FIG. 9c. Next, $PC_3$ detects contention between $P_3$ and $P_1$, computes $PAWM_{3,1}$, and reassigns the subpixels indicated by $PAWM_{3,1}$ from $P_1$ to $P_3$. Next, $PC_3$ detects contention between $P_3$ and $P_2$ (some subpixels were just reassigned from $P_1$ to $P_2$ by $PC_2$), computes $PAWM_{3,2}$, and reassigns the subpixels indicated by $PAWM_{3,2}$ from $P_2$ to $P_3$. The pixel record in mask memory is now as shown in FIG. 9e, which is the correct solution to the hidden surface problem.

Next, consider another exemplary sequence of events occurring during the raster conversion of $P_2$ and $P_3$. First, $PC_3$ detects contention between $P_3$ and $P_1$, computes $PAWM_{3,1}$, and reassigns the subpixels indicated by $PAWM_{3,1}$ from $P_1$ to $P_3$. The pixel record in mask memory is now as shown in FIG. 9d. Next, $PC_2$ detects contention between $P_2$ and $P_1$, computes $PAWM_{2,1}$, and reassigns the subpixels indicated by $PAWM_{2,1}$ from $P_1$ to $P_2$. Next, $PC_2$ detects contention between $P_2$ and $P_3$ (some subpixels were just reassigned from $P_1$ to $P_3$ by $PC_3$), computes $PAWM_{2,3}$, and reassigns the subpixels indicated by $PAWM_{2,3}$ from $P_3$ to $P_2$. The pixel record in mask memory is now as shown in FIG. 9e, which is again the correct solution to the hidden surface problem.

Thus, the hidden surface problem will be solved correctly, independent of the order in which contention between $P_1$ and $P_2$, and contention between $P_1$ and $P_3$, is detected and resolved by $PC_2$ and $PC_3$. But the correct solution is guaranteed only when one contention is resolved and subpixels are reassigned prior to the detection of another contention. For example, consider the following exemplary sequence of events occurring during the raster conversion of $P_2$ and $P_3$. First, $PC_2$ detects contention between $P_2$ and $P_1$ and begins to compute $PAWM_{2,1}$. Next, $PC_3$ detects contention between $P_3$ and $P_1$ and begins to compute $PAWM_{3,1}$. Next, $PC_2$ finishes computing $PAWM_{2,1}$ and reassigns the subpixels indicated by $PAWM_{2,1}$ from $P_1$ to $P_2$. The pixel record in mask memory is now as shown in FIG. 9c, which is a correct intermediate result. Next, $PC_3$ finishes computing $PAWM_{3,1}$ and reassigns the subpixels indicated by $PAWM_{3,1}$ from $P_1$ (and $P_2$) to $P_3$. Unfortunately, this action reassigns some subpixels from $P_2$ to $P_3$ because those subpixels were just reassigned from $P_1$ to $P_2$ by $PC_2$. But because $P_3$ is in fact in front of $P_2$, by chance the pixel record in mask memory is now as shown in FIG. 9e, which is the correct solution to the hidden surface problem.

However, consider this final exemplary sequence of events occurring during the raster conversion of $P_2$ and $P_3$. First, $PC_3$ detects contention between $P_3$ and $P_1$ and begins to compute $PAWM_{3,1}$. Next, $PC_2$ detects contention between $P_2$ and $P_1$ and begins to compute $PAWM_{2,1}$. Next, $PC_3$ finishes computing $PAWM_{3,1}$ and reassigns the subpixels indicated by $PAWM_{3,1}$ from $P_1$ to $P_3$. The pixel record in mask memory is now as shown in FIG. 9d, which is a correct intermediate result. Next, $PC_2$ finishes computing $PAWM_{2,1}$ and reassigns the subpixels indicated by $PAWM_{2,1}$ from $P_1$ (and $P_3$) to $P_2$. Unfortunately, this action reassigns some subpixels from $P_3$ to $P_2$, because those subpixels were just reassigned from $P_1$ to $P_3$ by $PC_3$. And because $P_2$ is actually behind $P_3$, by chance the pixel record in mask memory is now as shown in FIG. 9f, which is an incorrect solution to the hidden surface problem in that $P_2$ is represented to be in front of $P_3$.

This error arises because $P_3$ is not represented in the pixel 4 when $PC_2$ begins to compute $PAWM_{2,1}$. Thus, when $PC_2$ finishes computing $PAWM_{2,1}$, it reassigns the subpixels indicated by $PAWM_{2,1}$ from $P_1$ (and unfortunately from $P_3$) to $P_2$, without ever having detected contention between $P_2$ and $P_3$. The subpixels indicated by $PAWM_{3,1}$ have previously been reassigned from $P_1$ to $P_3$ by $PC_3$, but some of these subpixels are blindly reassigned by $PC_2$ from $P_3$ to $P_2$ without a test on the part of $PC_2$ for contention between $P_2$ and $P_3$.

This error suggests a correct implementation of a parallel raster conversion and hidden surface algorithm. A polygon computer $PC_n$ computes a priority award mask $PAWM_{n,o}$ in response to the contention for subpixels between two polygons. One of the polygons, $P_o$, is stored in the pixel record of mask memory. The other polygon, $P_n$, is in the process of raster conversion. The priority award mask $PAWM_{n,o}$ is used to reassign mask bits in the pixel record from $P_o$ to $P_n$. But, prior to reassignment, the polygon computer must check that each subpixel specified by $PAWM_{n,o}$ is indeed assigned to $P_o$. Only those subpixels which are specified by $PAWM_{n,o}$, and which are assigned to $P_o$, may be reassigned to $P_n$. Any subpixels which are specified by $PAWM_{n,o}$, and which are assigned to polygons other than $P_o$, i.e. $P_k$, indicate contention for subpixels between $P_n$ and $P_k$. This contention may be resolved by the polygon computer $PC_n$ in the same manner as for any other contention. For example, consider the final example which gave rise to an erroneous solution to the hidden surface problem. During the erroneous transaction with mask memory, $PC_2$ should have checked the subpixels specified by $PAWM_{2,1}$ and determined that some of those subpixels were no longer assigned to $P_1$ but rather had been reassigned by $P_3$. At that point, $PC_2$ would have detected a contention between $P_2$ and $P_3$ for the subpixels assigned to $P_3$.

Recapitulating, the subpixels specified by $PAWM_{n,o}$ must be checked by the polygon computer 118 to see whether they have been reassigned from $P_o$ to $P_k$. If they have not been reassigned from $P_o$ to $P_k$, they may be reassigned from $P_o$ to $P_n$. To perform this check, the polygon computer must read the pixel record from the mask memory 50, and examine the polygon address pointers in that pixel record. However, an alternate implementation of the mask memory can allow the mask memory itself to perform this check, as well as to perform other useful operations, as follows.

This alternate implementation of the mask memory includes storage for one million pixel records. It also includes sufficient processing capability to perform logical operations on nine-bit masks and to compare polygon address pointers. It operates in conjunction with the polygon computer in the three following modes. First, it receives from the polygon computer a pixel x,y address, a new polygon mask and a new polygon pointer, together with a request that the mask memory assign to the new polygon all subpixels specified by the new polygon mask which are currently unassigned. Second, it sends contention masks and associated polygon address pointers to the polygon computer. Third, it receives from the polygon computer a pixel x,y address, a priority award mask, a new polygon pointer and an old polygon pointer, together with a request that the mask memory reassign to the new polygon all subpixels specified by the new polygon mask which are currently assigned to the old polygon.

For the first mode of operation between the polygon computer and the mask memory, the polygon computer generates a new polygon mask NEWM representing the subpixels to be occupied by the new polygon within the pixel into which the new polygon is being raster converted. The polygon computer then provides the new mask NEWM, the new polygon address NPA and the pixel x,y address to the mask memory, together with a request to assign any unoccupied subpixels within the pixel to the new polygon. In response, the mask memory retrieves the pixel record specified by the pixel x,y address and assembles the old polygon mask OLDM from the mask bits (see FIG. 5). The mask memory then computes the logical AND between NEWM and the logical NOT of OLDM, thus producing the free mask FREM. FREM specifies unoccupied subpixels. The mask memory assigns these unoccupied subpixels to the new polygon by setting the mask bit of each unoccupied subpixel to "one" and by writing the new polygon address NPA into the polygon address pointer of each unoccupied subpixel. Then the mask memory computes the logical AND between NEWM and OLDM, thus producing the contention mask CONM. CONM specifies subpixels for which contention exists between the new polygon and previously processed polygons. If CONM contains "zero", no contention exists between the new polygon and any previously processed polygon. In this case, the transaction between the polygon computer and the mask memory is completed.

If, however, CONM does not contain "zero", contention exists between the new polygon and at least one previously processed polygon. This condition activates the second mode of operation between the polygon computer and the mask memory. In this mode, the mask memory must inform the polygon computer of the contention, and indicate with which previously processed polygon or polygons the contention occurs. If contention occurs with one previously processed polygon only, CONM is a simple contention mask. In this case, the mask memory transmits CONM, together with the polygon address pointer specified by the nonzero bits of CONM, to the polygon computer. If contention occurs with more than one previously processed polygon, CONM is a composite contention mask. In this case, the mask memory decomposes CONM into a series of simple contention masks and transmits each simple contention mask, together with the polygon address pointer specified by the nonzero bits of that simple contention mask, in sequence, to the polygon computer. The polygon address pointer specifies the previously processed polygon which is in contention with the new polygon. The previously processed polygon so specified is designated as the old polygon.

The polygon computer receives the contention mask or masks, together with the polygon address pointer associated with each contention mask, in sequence, from the mask memory. Each contention mask indicates contention between the new polygon and the polygon specified by the polygon address pointer, i.e. contention between the new polygon and the old polygon. The polygon computer resolves each contention in sequence by computing a priority award mask PAWM. At this point, the polygon computer is prepared for the third mode of operation between the polygon computer and the mask memory. In this mode, the polygon computer provides each priority award mask PAWM to the mask memory, together with a specification of the old polygon (i.e. the polygon address pointer), a specification of the new polygon (i.e. the new polygon address NPA), the pixel x,y address, and a request to reassign the subpixels specified by PAWM from the old polygon to the new polygon. In response, the mask memory checks that those subpixels are indeed assigned to the old polygon. Any subpixel assigned to the old polygon is reassigned to the new polygon by writing the new polygon address NPA into the polygon address pointer of that subpixel. Any subpixel not assigned to the old polygon indicates a contention between the new polygon and the polygon specified by the polygon address pointer of that subpixel. The mask memory must inform the polygon computer of the contention by transmitting a series of contention masks, together with polygon address pointers, back to the polygon computer.

Thus, the mask memory may include circuitry to facilitate its use by the polygon computer. This circuitry performs logical operations and compares polygon address pointers.

In view of the above description, it will be apparent that the system of the present invention may be implemented in a wide variety of systems utilizing numerous different specific techniques. Accordingly, the scope of the invention should be interpreted in accordance with the claims as set forth below.

What is claimed is:

1. A process for resolving priority at specific locations of designated coordinate values of x and y for a graphics display between a first primitive $P_1$ defined in conventional three-dimensional space in a plane $a_1x+b_1y+c_1z+d_1=0$ and a second primitive $P_2$ similarly defined in a plane $a_2x+b_2y+c_2z+d_2=0$, said planes potentially although not necessarily intersecting along a projected line of intersection in said display, comprising the steps of:

defining said projected line of intersection by determining the values of $(c_2a_1-c_1a_2)$, $(c_2b_1-c_1b_2)$ and $(c_2d_1-c_1d_2)$;

storing the determined values $(c_2a_1-c_1a_2)$, $(c_2b_1-c_1b_2)$ and $(c_2d_1-c_1d_2)$;

storing picture element data to define elemental areas of said graphics display;

resolving priority for said elemental areas in sequence as between said primitives for said display to determine precedence in favor of one of said primitives $P_1$ or $P_2$ under control of $c_1$, $c_2$, and one or more of $(c_2a_1-c_1a_2)$, $(c_2b_1-c_1b_2)$ and $(c_2d_1-c_1d_2)$; and storing display data of said one primitive for said elemental areas to provide electrical signals for the graphics display.

2. A process according to claim 1 including the further step of resolving said line of intersection existing between said primitives as more horizontal or more vertical as by determining the relative magnitudes of $(c_2a_1-c_1a_2)$ and $(c_2b_1-c_1b_2)$, and further resolving said priority under control of whether said line is either more horizontal or more vertical.

3. A process according to claim 2 wherein priority is resolved in favor of said first primitive to one side of said more vertical line, and priority is resolved in favor of said second primitive to the other side of said more vertical line, under control of $c_1$, $c_2$ and $(c_2a_1-c_1a_2)$.

4. A process according to claim 2 wherein priority is resolved in favor of said first primitive to one side of said more vertical line, and priority is resolved in favor of said second primitive to the other side of said more vertical line, under control of the signs of $c_1$, $c_2$ and $(c_2a_1-c_1a_2)$.

5. A process according to claim 2 wherein priority is resolved in favor of said first primitive to one side of said more horizontal line, and priority is resolved in favor of said second primitive to the other side of said more horizontal line, under control of $c_1$, $c_2$ and $(c_2b_1-c_1b_2)$.

6. A process according to claim 2 wherein priority is resolved in favor of said first primitive to one side of said more horizontal line, and priority is resolved in favor of said second primitive to the other side of said more horizontal line, under control of the signs of $c_1$, $c_2$ and $(c_2b_1-c_1b_2)$.

7. A process according to claim 1 wherein said priority is further resolved by determining the absence of an intersecting line between said planes.

8. A process according to claim 7 wherein said priority is resolved in favor of one of said primitives under control of $c_1$, $c_2$ and $(c_2d_1-c_1d_2)$.

9. A process according to claim 7 wherein said priority is resolved in favor of one of said primitives under control of the signs of $c_1$, $c_2$ and $(c_2d_1-c_1d_2)$.

10. A process according to claim 7 wherein determination of said absence of an intersecting line between planes is controlled by the determined magnitudes of $(c_2a_1-c_1a_2)$ and $(c_2b_1-c_1b_2)$.

11. A process according to claim 1 wherein said designated x and y values indicate subpixels for said display and said process further includes a step of computing composites for pixels in accordance with priorities determined for said subpixels.

12. A hidden surface elimination system for resolving priority as between primitives for a computer graphics image display with respect to picture element areas, the primitives $P_1$, $P_2$ and so on being defined in planes, $a_1x+b_1y+c_1z+d_1=0$; $a_2x+b_2y+c_2z+d_2=0$ and so on, the hidden surface elimination system comprising:

means for receiving primitive data to specify components for a computer graphics display in the form of said primitives $P_1$ and $P_2$ and so on;

structure for sequencing said picture element areas to be occupied by said primitives $P_1$ and $P_2$ as specified by the received primitive data to identify primitives contending for a picture element area;

structure for resolving priority between primitives $P_1$ and $P_2$ contending for a pixel area, by determining the values $(c_2a_1-c_1a_2)$, $(c_2b_1-c_1b_2)$ and $(c_2d_1-c_1d_2)$ and logically analyzing the signs of certain of the values to select one of said contending primitives P1 or P2 for the picture element area; and cache memory means for receiving the determined values $(c_2a_1-c_1a_2)$, $(c_2b_1-c_1b_2)$ and $(c_2d_1-c_1d_2)$ and means for identifying said values for use on occurrence of another pixel with contention between the primitives $P_1$ and $P_2$.

13. A hidden surface elimination system for resolving priority as between primitives for a computer graphics image display with respect to picture element areas, the primitives $P_1$, $P_2$ and so on being defined in planes, $a_1x+b_1y+c_1z+d_1=0$; $a_2x+b_2y+c_2z+d_2=0$ and so on, the hidden surface elimination system comprising:

means for receiving primitive data to specify components for a computer graphics display in the form of said primitives $P_1$ and $P_2$ and so on;

structure for sequencing said picture element areas to be occupied by said primitives $P_1$ and $P_2$ as specified by the received primitive data to identify primitives contending for a picture element area, said structure for sequencing comprising a raster converter for scan converting said primitives; and memory means for receiving the determined values $(c_2a_1-c_1a_2)$, $(c_2b_1-c_1b_2)$ and $(c_2d_1-c_1d_2)$ and means for identifying said values for use on occurrence of another pixel with contention between the primitives $P_1$ and $P_2$.

14. A system according to claim 13 comprising a plurality of said structures for resolving priority and further including means for coupling said plurality of structures to process said received primitive data and further including means for accessing said memory means by each of said structures.

15. A system according to claim 13 wherein said memory means further includes a polygon memory for storing primitive data and a mask memory for storing picture element data.

16. A system according to claim 15 wherein said mask memory stores subpixel data.

17. A hidden surface elimination system for resolving priority as between primitives for a computer graphics image display with respect to picture element areas, the primitives $P_1$, $P_2$ and so on being defined in planes, $a_1x+b_1y+c_1z+d_1=0$; $a_2x+b_2y+c_2z+d_2=0$ and so on, the hidden surface elimination system comprising:
  means for receiving primitive data to specify components for a computer graphics display in the form of said primitives $P_1$ and $P_2$ and so on;
  structure for sequencing said picture element areas to be occupied by said primitives $P_1$ and $P_2$ as specified by the received primitive data to identify primitives contending for a picture element area;
  a polygon memory for storing data on said polygons;
  a mask memory for storing data on said picture element areas;
  structure for resolving priority between primitives $P_1$ and $P_2$ contending for a pixel area, by determining the values $(c_2a_1-c_1a_2)$, $(c_2b_1-c_1b_2)$ and $(c_2d_1-c_1d_2)$ and logically analyzing the signs of certain of the values to select one of said contending primitives P1 or P2 for the picture element area; and
  means for storing signal indications of said one contending primitive in said mask memory.

18. A system according to claim 17 wherein said mask memory stores designations for polygons in said polygon memory to indicate data for said picture element areas.

19. A system according to claim 17 further including a frame buffer storage for said image display and means for storing data from said mask memory and said polygon memory in said frame buffer storage.

20. A system according to claim 19 wherein said means for storing further includes means for processing said data from said mask memory and said polygon memory for shading.

* * * * *